(12) United States Patent
Ferber et al.

(10) Patent No.: US 12,433,302 B2
(45) Date of Patent: Oct. 7, 2025

(54) METHOD AND SYSTEM FOR 2D PRINTING OF DEHYDRATED EDIBLE AND NON-EDIBLES AND RECONSTITUTION THEREOF

(71) Applicant: VITIPRINTS, LLC, New York, NY (US)

(72) Inventors: Andrew Ferber, New York, NY (US); John Gentile, New York, NY (US); Harrison Ferber, New York, NY (US); Dmytro Konovalov, New York, NY (US)

(73) Assignee: Vitiprints, LLC, New York, NY (US)

( * ) Notice: Subject to any disclaimer, the term of this patent is extended or adjusted under 35 U.S.C. 154(b) by 0 days.

(21) Appl. No.: 18/502,588

(22) Filed: Nov. 6, 2023

(65) Prior Publication Data

US 2025/0143336 A1    May 8, 2025

(51) Int. Cl.
 *A23C 23/00* (2006.01)

(52) U.S. Cl.
 CPC ..................... *A23C 23/00* (2013.01)

(58) Field of Classification Search
 CPC .................................................. A23C 23/00
 USPC ....................................................... 426/531
 See application file for complete search history.

(56) References Cited

U.S. PATENT DOCUMENTS

| 4,279,932 A | * | 7/1981 | Koshida | ............... | A23P 20/20 |
| | | | | | 426/94 |
| 2013/0052234 A1 | * | 2/2013 | Goldberg | ............. | A61K 31/522 |
| | | | | | 514/415 |

FOREIGN PATENT DOCUMENTS

| CN | 86100825 A | * | 10/1986 | | |
| CN | 1640279 A | * | 7/2005 | | |
| CN | 1649485 A | * | 8/2005 | ............... | A01J 25/12 |
| CN | 102984952 A | * | 3/2013 | ........... | A23C 9/1565 |
| CN | 103609704 A | * | 3/2014 | | |
| CN | 103621638 A | * | 3/2014 | | |
| CN | 104543005 A | * | 4/2015 | | |
| CN | 106857858 A | * | 6/2017 | | |
| CN | 108576229 A | * | 9/2018 | | |
| CN | 111887299 A | * | 11/2020 | | |
| EA | 026602 B1 | * | 4/2017 | | |
| JP | 55061774 A | * | 5/1980 | ............... | A01J 25/12 |
| JP | S646756 B2 | * | 2/1989 | | |
| JP | H0311666 U | * | 2/1991 | | |
| JP | H03292861 A | * | 12/1991 | | |

OTHER PUBLICATIONS

Sun et al. (Translation of CN 1709088 A) (Dec. 21, 2005). (Year: 2005).*
Google search report retrieved on Jun. 2024. (Year: 2024).*
NPL Molding and Casting (Retrieved on Jun. 2024). (Year: 2024).*
NPL Thin Tablet (Retrieved on Oct. 1, 2024). (Year: 2024).*
NPL Tablet (Retrieved on Oct. 1, 2024). (Year: 2024).*
NPL Extrusion (Retrieved on Oct. 1, 2024). (Year: 2024).*
NPL Flakes (Retrieved on Oct. 1, 2024). (Year: 2024).*
NPL Skim Milk Powder moisture (Retrieved on Oct. 1, 2024). (Year: 2024).*
NPL Oat milk Sheet in [https://www.trendwatching.com/innovation-of-the-day/milik-introduces-sheets-of-oat-milk-that-just-need-water-and-30-seconds-in-a-blender]. (Jul. 2023). (Year: 2023).*

* cited by examiner

*Primary Examiner* — Erik Kashnikow
*Assistant Examiner* — Bhaskar Mukhopadhyay
(74) *Attorney, Agent, or Firm* — Lerner David LLP

(57) ABSTRACT

The present invention relates to a reconstitutable sheet comprising a dehydrated substance that can be reconstituted to a hydrated form, offering a groundbreaking approach to water-based food processing and storage. Versatile sheet making methods, such as printing methods, and efficient reconstitution processes pave the way for a revolution in dairy and alternate milk and all water-based edibles and non-edible product consumption, distribution, and storage.

30 Claims, 32 Drawing Sheets

| | |
|---|---|
| Carbohydrate Content | 66-82.5% |
| Sugar Content | 18-20.8% |
| Fat Content | 5-9% |
| Protein Content | 5.9-15% |
| Fiber Content | 2-6% |

FIG. 12

| Carbohydrate Content | 66-81% |
|---|---|
| Sugar Content | 18-20% |
| Fat Content | 6.2-7.2% |
| Protein Content | 5.9-14.1% |
| Fiber Content | 4.8-6% |

FIG. 13

| Carbohydrate Content | 54.1-81% |
|---|---|
| Sugar Content | 18-54.1% |
| Fat Content | 0-10% |
| Protein Content | 5.9-33.4% |
| Fiber Content | 0-6% |

FIG. 14

| Ingredient | % (w/v) |
|---|---|
| Water | about 21% to about 31% |
| Enzymatically treated oat milk | about 63% to about 77% |
| Glycerin | about 1% to about 7% |

FIG. 15

| Ingredient | Ounces |
|---|---|
| Water | about 6.8 oz. to about 10 oz. |
| Enzymatically treated oat milk | about 20.5 oz to about 25 oz. |
| Glycerin | about 0.3 oz. to about 2.7 oz. |

FIG. 16

| Ingredient | Grams |
|---|---|
| Oat sheet | about 10 g to about 20 g |
| Water | about 100 g |

FIG. 17

| Ingredient | Grams |
|---|---|
| Oat sheet | about 100 g to about 150 g |
| Water | about 850 g to about 900 g |

FIG. 18

| Ingredient | Grams |
|---|---|
| Oat sheet | about 25 g to about 35 g |
| Water | about 200 g to about 210 g |

METHOD AND SYSTEM FOR 2D PRINTING OF DEHYDRATED EDIBLE AND NON-EDIBLES AND RECONSTITUTION THEREOF

INCORPORATION BY REFERENCE

All documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

The present invention relates to the field of food technology and sheet making, such as printing or 2D printing, casting, coating, or extrusion; reconstitutable sheets that can be reconstituted to a hydrated form, dehydrated sheets and reconstitution thereof. The present invention offers a groundbreaking approach to water-based food processing and storage. Through versatile sheet making, e.g., printing, methods and efficient reconstitution processes, the present invention paves the way for a revolution in mammalian and plant based milk product consumption, distribution, and storage. For example, the present invention pertains to a method and system for turning liquid edibles (e.g., milk) into a solid sheets that are thin and nearly two-dimensional (2D) in form, e.g., printed form, by removing water content and forming or processing into a sheet, e.g., by printing, casting, coating, or extrusion whereby the liquid is formed as a solid; and thereafter, when desired the sheet can subsequently be reconstituted from the solid to a liquid state into a specific amount as determined by the supplier and desired by the user.

BACKGROUND OF THE INVENTION

Milk, a primary source of nutrition for many, typically exists in liquid form which can be cumbersome to transport, store, and may have a limited shelf life. Current dehydration methods such as spray drying or freeze-drying, while effective, lack the ability to create structured, thin solid forms that are easily rehydratable. There is a need for a method that not only dehydrates milk but also transforms it into a user-friendly solid state, which can be easily stored, transported, and reconstituted just as easily back into its liquid state.

Citation or identification of any document in this application is not an admission that such document is available as prior art to the present invention.

SUMMARY OF THE INVENTION

The present invention relates to a reconstitutable sheet of edible liquid concentrate comprising:
(a) a dehydrated milk substance;
(b) a water-soluble polymer;
(c) a predetermined portion size to ensure consistent quantity and quality upon reconstitution; and
(d) instructions for reconstitution specifying an appropriate volume of liquid for dissolution;
wherein, the reconstitutable sheet is reconstituted into a liquid milk or milk-like edible product.

In some embodiments, the dehydrated milk substance comprises milk sourced from a mammal, a plant, a laboratory, or any combination thereof.

In some embodiments, the milk sourced from a mammal comprises cow milk, goat milk, sheep milk, camel milk, yak milk, or buffalo milk.

In some embodiments, the dehydrated milk substance comprises milk sourced from a plant comprises coconut milk, almond milk, soy milk, oat milk, pistachio milk, macadamia milk, chickpea milk, flax seed milk, hemp milk, hazelnut milk, sesame milk, or cashew milk.

In some embodiments, the milk sourced from a laboratory comprises milk sourced from precision fermentation, cellular agriculture, plant-based bio-mimicry, synthetic biology algal based production, microbial production, cell cultivation, enzymatic modification, molecular synthesis, algae cultivation, genetic modification, protein formulation, or bioengineered plant proteins.

In some embodiments, the water-soluble polymer is a binding agent comprising agar-agar or carrageenan.

In some embodiments, the reconstitution comprises agitating the reconstitutable sheet in the appropriate volume of liquid to dissolve and evenly distribute the reconstitutable sheet, wherein the agitating comprises mechanical agitation or manual agitation.

In some embodiments, the reconstitutable sheet further comprises fortifying nutritional enhancers, wherein the fortifying nutritional enhancers comprise vitamins, minerals, proteins, fats, carbohydrates, colorings, or flavorings.

In some embodiments, the dehydrated milk substance comprises 1-15% by weight of the moisture of the substance in hydrated form.

In some embodiments, the reconstitutable sheet comprises the dimensions: about 1 mm to about 200 cm in length, about 1 mm to about 200 cm in height, and about 0.05 mm to about 50 mm in thickness.

In some embodiments, the reconstitutable sheet comprises the dimensions: about 0.5 cm to about 100 cm in length, about 0.5 cm to about 100 cm in height, and about 0.05 mm to about 50 mm in thickness. Specific supplemental layers can be 0.001 mm to about 2 mm in thickness.

In some embodiments, the reconstitutable sheet comprises two or more layers.

In some embodiments, the two or more layers comprise the same dehydrated substance.

In some embodiments, the two or more layers comprise different dehydrated substances.

In some embodiments, the sheet is processed via a printing method.

In some embodiments, the sheet is processed via a casting method.

In some embodiments, the sheet is processed via a coating method.

In some embodiments, the sheet is processed via an extrusion method.

In some embodiments, the reconstitutable sheet further comprises a support substrate.

In some embodiments, the support substrate is dissolvable in a liquid.

In some embodiments, the dehydrated substance is processed on the support substrate.

In some embodiments, the dehydrated substance and the support substrate are uniform in size.

The present invention also envisions a package comprising a reconstitutable sheet wherein the reconstitutable sheet comprises a dehydrated substance that can be reconstituted to a hydrated form, and wherein the dehydrated substance comprises an edible liquid.

In some embodiments, the reconstitutable sheets are individually wrapped, stacked and separated by a removable layer, or stored in a resealable container.

The present invention also envisions a method of producing a reconstitutable sheet wherein the reconstitutable sheet comprises a dehydrated substance that can be reconstituted to a hydrated form, and wherein the dehydrated substance comprises an edible liquid, the method comprising:
 (a) preparing the dry ingredients,
 (b) incorporating the dry ingredients with the fluid medium to form a base,
 (c) homogenizing the base,
 (d) generating the edible liquid by processing the base with a printer, coater, caster or an extruder,
 (e) drying the edible liquid to form the reconstitutable sheet comprising the dehydrated substance, and
 (f) reconstituting the reconstitutable sheet in a fluid medium.

In some embodiments, step (a) further comprises the step:
 (i) milling, grinding, or blending the dry ingredients into a fine paste or powder-like consistency.

In some embodiments, step (b) further comprises the steps:
 (i) incorporating a water soluble binding agent, and
 (ii) optionally adding at least one fortifying nutritional enhancer.

In some embodiments, step (d) further comprises the steps:
 (i) placing a release sheet onto the printer, coater, caster or extruder, wherein the printer further comprises a stencil,
 (ii) pouring the base onto the stencil, coater, caster or extruder,
 (iii) cutting the reconstitutable sheet into dimensions comprising about 1 mm to about 200 cm in length, about 1 mm to about 200 cm in height, and about 0.05 mm to about 50 mm in thickness.
 (iv) removing the release sheet, which carries the freshly processed edible liquid.

In some embodiments, step (e) comprises natural indoor or outdoor drying, drying with leveraged airflow and temperature, drying via solar radiation, drum drying, convection drying, oven baking, microwave drying, or infrared drying.

In some embodiments, step (f) further comprises the steps:
 (i) placing the reconstitutable sheet into a container,
 (ii) adding the an appropriate amount of liquid to the container,
 (iii) agitating the contents of the container to reconstitute and evenly distribute the sheet into a milk or milk-like edible product, wherein the agitating comprises manual agitation or mechanical agitation.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

FIGS. 1A-1B. Schematic views of a reconstitutable sheet in accordance with some embodiments of the present application. 1A) a schematic view depicting a reconstitutable sheet 100 including a dehydrated substance 102. 1B) a schematic view depicting a reconstitutable sheet 110 including dehydrated substance(s) in a first layer 102 and a second layer 104.

FIGS. 2A-2D. Schematic views of a reconstitutable sheet in accordance with some embodiments of the present application. 2A) a schematic view depicting a reconstitutable sheet 200 including a support substrate 202 encompassing a first layer 201. 2B) a schematic view depicting a reconstitutable sheet 210 including a first layer 201 completely encapsulated by the support substrate 202. A second layer 204 is not encapsulated by the support substrate 202. 2C) a schematic view depicting a reconstitutable sheet 220 including two layers 210 and 212 fully encapsulated by a support substrate 202. 2D) a schematic view depicting a reconstitutable sheet 230 including a first layer 230 encapsulated by a first support substrate 242 and a second layer 232 encapsulated by a second support substrate 252.

FIG. 11. Example of enzymatic oat base characteristics.

FIG. 12. Example of enzymatic almond base characteristics.

FIG. 13. Example of dairy milk powder base characteristics.

FIG. 14. Example of the preparation of oat "ink".

FIG. 15. Example of a recipe to make 1 L of printed oat "ink".

FIG. 16. Example of the reconstitution of a processed oat sheet.

FIG. 17. Example of a recipe to make 1 L of oat milk from a processed oat sheet.

FIG. 18. Example of a recipe to make 8 ounces of oat milk from a processed oat sheet.

DETAILED DESCRIPTION OF THE INVENTION

Figure 2A:
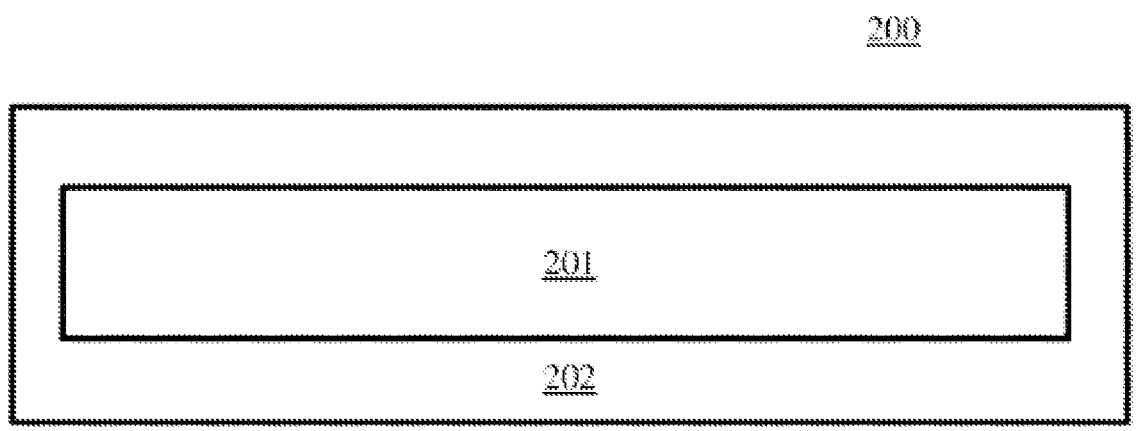

The present invention relates to a reconstitutable sheet comprising a dehydrated substance that can be reconstituted to a hydrated form.

The invention provides a novel technology for transforming water or alcohol-based foods into a sheet or printed or 2D printed solid form by eliminating its water content. When water is added to the solid form, it can be solubilized back to its liquid state. In addition to print methods like screen-based and flexo-based print techniques this technology also uses three additional distinct methods for printing liquids as solids based on the edible or non-edible product and volume of that product being produced: casting, coating, extrusion.

The present invention provides a user-friendly solid state of edible foods (i.e., milk) that's easily storable and transportable.

Multiple printing methods provide flexibility in terms of final product appearance and texture that can be customized based on the product being produced and the volume requirements for the product to determine the best "print" solution.

The integration of dehydration prior and within the printing process is unique, bypassing the need for pre-dehydrated powders by using actual raw components.

The solid form ensures easy reconstitution, offering a practical solution for diverse applications, from consumer use to commercial settings.

As used in the present application, "cold water" refers to water within the range of about 0° C. to about 20° C., "room temperature water" refers to water within the range of about 21° C. to about 29° C., "warm water" refers to water within the range of about 30° C. to about 40° C., and "hot water" refers to water within the range of about 41° C. to about 100° C. The same temperature ranges apply when the adjectives "cold", "room temperature", "warm", and "hot" are applied to other aqueous or nonaqueous solutions, aside from pure water.

As used in the present application, "dissolvable" means capable of dissolution in cold, room temperature, or warm water or other aqueous or nonaqueous liquid solutions within at least 120 seconds, where no stirring, agitation, or physical friction is necessary for such dissolution.

As used in the present application, "ink" refers to any substance being processed via printing, casting, coating, or extrusion. Non-limiting examples of "ink" include edible ink, printer ink (e.g., inkjet ink), a dehydrated substance, such as plant based milk constituents, animal-based milk, lab produced milk, synthetic milk etc., or a dissolvable composition.

As used in the present application, "reconstituted" refers to an aqueous composition formed by adding water to a solid material comprising a dehydrated substance, a reconstitutable sheet, a dissolvable composition, or a surfactant composite.

As used in the present application, "dehydrated" refers to a substance from which more than about 50% of the water has been removed.

As used in the present application, "hydrated" refers to a substance wherein most, if not all, of the water content normally or naturally present in the substance remains in the substance or is re-added to the substance after dehydration of said substance.

As used in the present application, "reconstitutable sheet" refers to dehydrated substance, or dissolvable composition that has been processed via printing, casting, coating, or extrusion to form a sheet.

As used in the present application, "edible" refers to any product, composition, ingredient, additive, material, etc. which may be orally ingested, and which is generally safe for humans, other animals, etc. to eat. Edible products, compositions, dissolvable compositions, liquids, foods, solids, sheets, etc. may include beverages, foods, pet foods, animal feed, nutritional supplements, etc. and may or may not be diluted and/or concentrated.

As used in the present application, "dry ingredient" refers to any component or ingredient of any product, composition, material, reconstitutable sheet, edible liquid, dehydrated substance, etc. that is to be processed and with low moisture content and are to be mixed or incorporated or added to water or any other fluid medium to create a desired formulation (e.g., an edible liquid, dissolvable composition, reconstitutable sheet, or surfactant composite).

As used in the present application, "base" refers to the product, composition, material, edible product, edible liquid, dissolvable composition, etc. generated as a result of the mixing and/or the incorporation of the dry ingredients with water and/or any other fluid medium.

As used in the present application, "milk" or "milk-like" refers to a hydrated or dehydrated, and/or a synthetic or natural, nutritional product (e.g., a food or beverage), or any ingredients or constituents thereof, sourced from mammals, plants, laboratories, or any combination thereof.

In some embodiments, the reconstitutable sheet comprises a first volume and is prepared from a second volume of the substance in hydrated form. In some embodiments, the first volume is the result of the dehydration of the substance of the second volume in hydrated form. Dehydration methods include but are not limited to solar drying, convection drying, drum drying, microwave drying, or infrared radiation drying.

In some embodiments, the temperature suitable for drying includes, but is not limited to about 5 C, about 10 C, about 20° C., about 25° C., about 30° C., about 35° C., about 40° C., about 45° C., about 50° C., about 55° C., about 60° C., about 65° C., about 70° C., about 75° C., about 80° C., about 80° C., about 85° C., about 90° C., about 95° C. and about 100 C. In some embodiments, the length of time for optimal drying includes, but is not limited to, about 1 second to 5 minutes, about 5 minutes to about 10 minutes, about 10 minutes to about 15 minutes, about 15 minutes to about 20 minutes, about 20 minutes to about 25 minutes, about 25 minutes to about 30 minutes, about 30 minutes to about 35 minutes, about 35 minutes to about 40 minutes, about 40 minutes to about 45 minutes, about 45 minutes to about 50 minutes, about 50 minutes to about 55 minutes, about 55 minutes to about 1 hour, about 1 hour to about 1.5 hours, about 1.5 hours, to about 2 hours, about 2 hours to about 2.5 hours, about 2.5 hours to about 3 hours, about 3 hours to about 3.5 hours, about 3.5 hours to about 4 hours, about 4 hours to about 4.5 hours, about 4.5 hours to about 5 hours, about 5 hours to about 5.5 hours, about 5.5 hours to about 6 hours, about 6 hours to about 6.5 hours, about 6.5 hours to about 7 hours, about 7 hours to about 7.5 hours, about 7.5 hours to about 8 hours, about 8 hours to about 8.5 hours, about 8.5 hours to about 9 hours, about 9 hours to about 9.5 hours, about 9.5 hours to about 10 hours, about 10 hours to about 12 hours, about 12 hours to about 14 hours, about 14 hours to about 16 hours, about 16 hours to about 18 hours, about 18 hours to about 20 hours, about 20 hours to about 22 hours, about 22 hours to about 24 hours, and about 24 hours to about 48 hours.

"Solar drying" refers to the use of a specially designed dehydrator that utilizes the sun as its heat source and increases the temperature and air current to speed up drying time. Solar dryers can use a reflectant, such as aluminum foil or glass, to increase the sun's temperature by 20-30° F. An air current is improved by using air vents at either end of the dryer. As cool air enters the dryer, crossing the substance, it removes the moisture from the substance.

"Convection drying" refers to the use of a convection oven as the dehydrating mechanism. Convection drying utilizes low heat (about 140 to about 160° F.) and plenty of air circulation to dehydrate substances.

"Drum drying" refers to the method of dehydrating substances with a drying drum. During the drum drying process, substances are dried at relatively low temperatures over rotating, high capacity drums that produce sheets of drum-dried substances.

"Microwave drying" refers to the method of dehydrating substances by exposing those substances to microwaves.

"Infrared radiation drying" refers to a method of dehydrating substances that relies on electromagnetic radiation to uniformly, quickly, and gently dehydrate substances.

In some embodiments, the reconstitutable sheet comprises a first volume or dehydrated substance that is less than about 50% of the second volume or hydrated substance in which the dehydrated substance derives. In some embodiments, the dehydrated substance, or first volume, is 45% of the second volume, or hydrated substance in which the dehydrated substance derives. In some embodiments, the dehydrated substance, or first volume, is about 40% to about 45% of the second volume, or hydrated substance in which the dehydrated substance derives. In some embodiments, the dehydrated substance, or first volume, is about 35% to about 40% of the second volume, or hydrated substance in which the dehydrated substance derives. In some embodiments, the dehydrated substance, or first volume, is about 30% to about 35% of the second volume, or hydrated substance in which the dehydrated substance derives. In some embodiments, the dehydrated substance, or first volume, is about 25% to about 30% of the second volume, or hydrated substance in which the dehydrated substance derives. In some embodiments, the dehydrated substance, or first volume, is about 20% to about 25% of the second volume, or hydrated substance in which the dehydrated substance derives. In some embodiments, the dehydrated substance, or first volume, is about 15% to about 20% of the second volume, or hydrated substance in which the dehydrated substance derives. In some embodiments, the dehydrated substance, or first volume, is about 10% to about 15% of the second volume, or hydrated substance in which the dehydrated substance derives. In some embodiments, the dehydrated substance, or first volume, is about 5% to about 10% of the second volume, or hydrated substance in which the dehydrated substance derives. In some embodiments, the dehydrated substance, or first volume, is about 3% to about 15% of the second volume, or hydrated substance in which the dehydrated substance derives. In some embodiments, the dehydrated substance, or first volume, is about 3% to about 6% of the second volume, or hydrated substance in which the dehydrated substance derives. In some embodiments, the dehydrated substance, or first volume, is about 1% to about 5% or about 1% to about 3% of the second volume, or hydrated substance in which the dehydrated substance derives.

In some embodiments, the reconstitutable sheet comprises a first volume or dehydrated substance that is less than about 50% of the second volume or hydrated substance in which the dehydrated substance derives. In some embodiments, the reconstitutable sheet comprises a first volume or dehydrated substance that is about 55% of the second volume or hydrated substance in which the dehydrated substance derives. In some embodiments, the reconstitutable sheet comprises a first volume or dehydrated substance that is about 55-60% of the second volume or hydrated substance in which the dehydrated substance derives. In some embodiments, the reconstitutable sheet comprises a first volume or dehydrated substance that is about 60-65% of the second volume or hydrated substance in which the dehydrated substance derives. In some embodiments, the reconstitutable sheet comprises a first volume or dehydrated substance that is about 65-70% of the second volume or hydrated substance in which the dehydrated substance derives. In some embodiments, the reconstitutable sheet comprises a first volume or dehydrated substance that is about 70-75% of the second volume or hydrated substance in which the dehydrated substance derives. In some embodiments, the reconstitutable sheet comprises a first volume or dehydrated substance that is about 75-80% of the second volume or hydrated substance in which the dehydrated substance derives. In some embodiments, the reconstitutable sheet comprises a first volume or dehydrated substance that is about 80-85% of the second volume or hydrated substance in which the dehydrated substance derives. In some embodiments, the reconstitutable sheet comprises a first volume or dehydrated substance that is about 85-90% of the second volume or hydrated substance in which the dehydrated substance derives. In some embodiments, the reconstitutable sheet comprises a first volume or dehydrated substance that is about 88-90% of the second volume or hydrated substance in which the dehydrated substance derives. In some embodiments, the reconstitutable sheet comprises a first volume or dehydrated substance that is about 90-95% of the second volume or hydrated substance in which the dehydrated substance derives. In some embodiments, the reconstitutable sheet comprises a first volume or dehydrated substance that is about 95-99% of the second volume or hydrated substance in which the dehydrated substance derives.

In some embodiments, the reconstitutable sheet comprises a first mass or dehydrated substance that is less than about 50% of the second mass or hydrated substance in which the dehydrated substance derives. In some embodiments, the dehydrated substance, or first mass, is about 45% of the second mass, or hydrated substance in which the dehydrated substance derives. In some embodiments, the dehydrated substance, or first mass, is about 40-45% of the second mass, or hydrated substance in which the dehydrated substance derives. In some embodiments, the dehydrated substance, or first mass, is about 35-40% of the second mass, or hydrated substance in which the dehydrated substance derives. In some embodiments, the dehydrated substance, or first mass, is about 30-35% of the second mass, or hydrated substance in which the dehydrated substance derives. In some embodiments, the dehydrated substance, or first mass, is about 25-30% of the second mass, or hydrated substance in which the dehydrated substance derives. In some embodiments, the dehydrated substance, or first mass, is about 20-25% of the second mass, or hydrated substance in which the dehydrated substance derives. In some embodiments, the dehydrated substance, or first mass, is about 15-20% of the second mass, or hydrated substance in which the dehydrated substance derives. In some embodiments, the dehydrated substance, or first mass, is about 10-15% of the second mass, or hydrated substance in which the dehydrated substance derives. In some embodiments, the dehydrated substance, or first mass, is about 5-10% of the second mass, or hydrated substance in which the dehydrated substance derives. In some embodiments, the dehydrated substance, or first mass, is about 3-15% of the second mass, or hydrated substance in which the dehydrated substance derives. In some embodiments, the dehydrated substance, or first mass, is about 3-6% of the second mass, or hydrated substance in which the dehydrated substance derives. In some embodiments, the dehydrated substance, or first mass, is about 1-5% or about 1-3% of the second mass, or hydrated substance in which the dehydrated substance derives.

In some embodiments, the reconstitutable sheet comprises a first mass or dehydrated substance that is less than about 50% of the second mass or hydrated substance in which the dehydrated substance derives. In some embodiments, the reconstitutable sheet comprises a first mass or dehydrated substance that is about 55% of the second mass or hydrated substance in which the dehydrated substance derives. In some embodiments, the reconstitutable sheet comprises a first mass or dehydrated substance that is about 55-60% of the second mass or hydrated substance in which the dehydrated substance derives. In some embodiments, the reconstitutable sheet comprises a first mass or dehydrated substance that is about 60-65% of the second mass or hydrated substance in which the dehydrated substance derives. In some embodiments, the reconstitutable sheet comprises a first mass or dehydrated substance that is about 65-70% of the second mass or hydrated substance in which the dehydrated substance derives. In some embodiments, the reconstitutable sheet comprises a first mass or dehydrated substance that is about 70-75% of the second mass or hydrated substance in which the dehydrated substance derives. In some embodiments, the reconstitutable sheet comprises a first mass or dehydrated substance that is about 75-80% of the second mass or hydrated substance in which the dehydrated substance derives. In some embodiments, the reconstitutable sheet comprises a first mass or dehydrated substance that is about 80-85% of the second mass or hydrated substance in which the dehydrated substance derives. In some embodiments, the reconstitutable sheet comprises a first mass or dehydrated substance that is about 85-90% of the second mass or hydrated substance in which the dehydrated substance derives. In some embodiments, the reconstitutable sheet comprises a first mass or dehydrated substance that is about 88-90% of the second mass or hydrated substance in which the dehydrated substance derives. In some embodiments, the reconstitutable sheet comprises a first mass or dehydrated substance that is about 90-95% of the second mass or hydrated substance in which the dehydrated substance derives. In some embodiments, the reconstitutable sheet comprises a first mass or dehydrated substance that is about 95-99% of the second mass or hydrated substance in which the dehydrated substance derives.

In some embodiments, the dehydrated substance comprises a moisture content that is from about 1% to about 10%, about 10% to about 20%, about 20% to about 30%, about 30% to about 40%, and about 40% to about 50%. In some embodiments, the moisture content of the dehydrated substance is about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, and about 50%.

In some embodiments, the reconstitutable sheet comprises a length of about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, about 20 cm, about 21 cm, about 22 cm, about 23 cm, about 24 cm, about 25 cm, about 26 cm, about 27 cm, about 28 cm, about 29 cm, about 30 cm, about 31 cm, about 32 cm, about 33 cm, about 34 cm, about 35 cm, about 36 cm, about 37 cm, about 38 cm, about 39 cm, about 40 cm, about 41 cm, about 42 cm, about 43 cm, about 44 cm, about 45 cm, about 46 cm, about 47 cm, about 48 cm, about 49 cm, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, or about 100 cm.

In some embodiments, the reconstitutable sheet comprises a height of about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, about 20 cm, about 21 cm, about 22 cm, about 23 cm, about 24 cm, about 25 cm, about 26 cm, about 27 cm, about 28 cm, about 29 cm, about 30 cm, about 31 cm, about 32 cm, about 33 cm, about 34 cm, about 35 cm, about 36 cm, about 37 cm, about 38 cm, about 39 cm, about 40 cm, about 41 cm, about 42 cm, about 43 cm, about 44 cm, about 45 cm, about 46 cm, about 47 cm, about 48 cm, about 49 cm, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, or about 100 cm.

In some embodiments, the reconstitutable sheet comprises a thickness of about 0.5 mm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, or about 50 mm.

In some embodiments, the reconstitutable sheet comprises the dimensions in a variety of shapes including but not limited to squares, rectangles, circles and ellipses of about 0.1 mm, about 1 mm, about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, about 20 cm, about 21 cm, about 22 cm, about 23 cm, about 24 cm, about 25 cm, about 26 cm, about 27 cm, about 28 cm, about 29 cm, about 30 cm, about 31 cm, about 32 cm, about 33 cm, about 34 cm, about 35 cm, about 36 cm, about 37 cm, about 38 cm, about 39 cm, about 40 cm, about 41 cm, about 42 cm, about 43 cm, about 44 cm, about 45 cm, about 46 cm, about 47 cm, about 48 cm, about 49 cm, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, or about 100 cm in length, about 0.5 mm, about 1 cm, about 2 cm, about 3 cm, about 4 cm, about 5 cm, about 6 cm, about 7 cm, about 8 cm, about 9 cm, about 10 cm, about 11 cm, about 12 cm, about 13 cm, about 14 cm, about 15 cm, about 16 cm, about 17 cm, about 18 cm, about 19 cm, about 20 cm, about 21 cm, about 22 cm, about 23 cm, about 24 cm, about 25 cm, about 26 cm, about 27 cm, about 28 cm, about 29 cm, about 30 cm, about 31 cm, about 32 cm, about 33 cm, about 34 cm, about 35 cm, about 36 cm, about 37 cm, about 38 cm, about 39 cm, about 40 cm, about 41 cm, about 42 cm, about 43 cm, about 44 cm, about 45 cm, about 46 cm, about 47 cm, about 48 cm, about 49 cm, about 50 cm, about 51 cm, about 52 cm, about 53 cm, about 54 cm, about 55 cm, about 56 cm, about 57 cm, about 58 cm, about 59 cm, about 60 cm, about 61 cm, about 62 cm, about 63 cm, about 64 cm, about 65 cm, about 66 cm, about 67 cm, about 68 cm, about 69 cm, about 70 cm, about 71 cm, about 72 cm, about 73 cm, about 74 cm, about 75 cm, about 76 cm, about 77 cm, about 78 cm, about 79 cm, about 80 cm, about 81 cm, about 82 cm, about 83 cm, about 84 cm, about 85 cm, about 86 cm, about 87 cm, about 88 cm, about 89 cm, about 90 cm, about 91 cm, about 92 cm, about 93 cm, about 94 cm, about 95 cm, about 96 cm, about 97 cm, about 98 cm, about 99 cm, or about 100 cm in height, and about 0.1 mm, about 0.5 mm, about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 31 mm, about 32 mm, about 33 mm, about 34 mm, about 35 mm, about 36 mm, about 37 mm, about 38 mm, about 39 mm, about 40 mm, about 41 mm, about 42 mm, about 43 mm, about 44 mm, about 45 mm, about 46 mm, about 47 mm, about 48 mm, about 49 mm, or about 50 mm in thickness, or any combination thereof.

In some embodiments, an individual layer may range in thickness from about 1 micron to about 15 mm, or greater than about 15 mm.

In some embodiments, the reconstitutable sheet may comprise two or more layers comprised of dehydrated substance. In this regard, the two or more layers may be comprised of the same dehydrated substance or different dehydrated substances. In some embodiments, the two or more layers may be comprised of multiple layers with the same dehydrated substances and at least one layer with a different dehydrated substance.

Figure 1A:
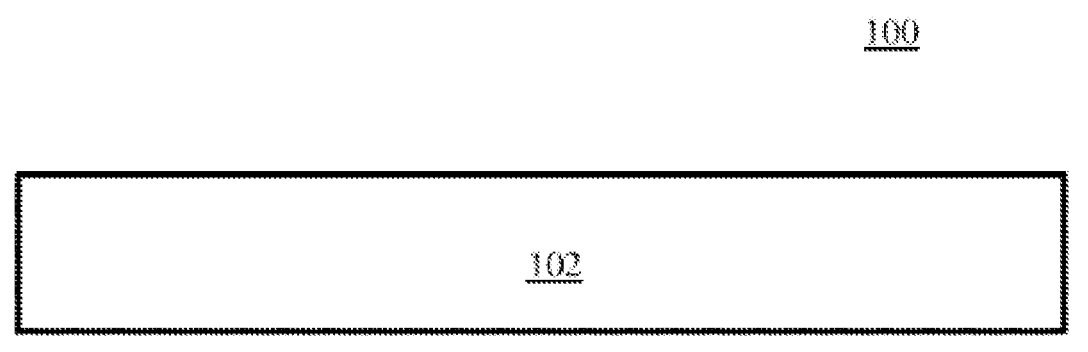
Figure 1B:
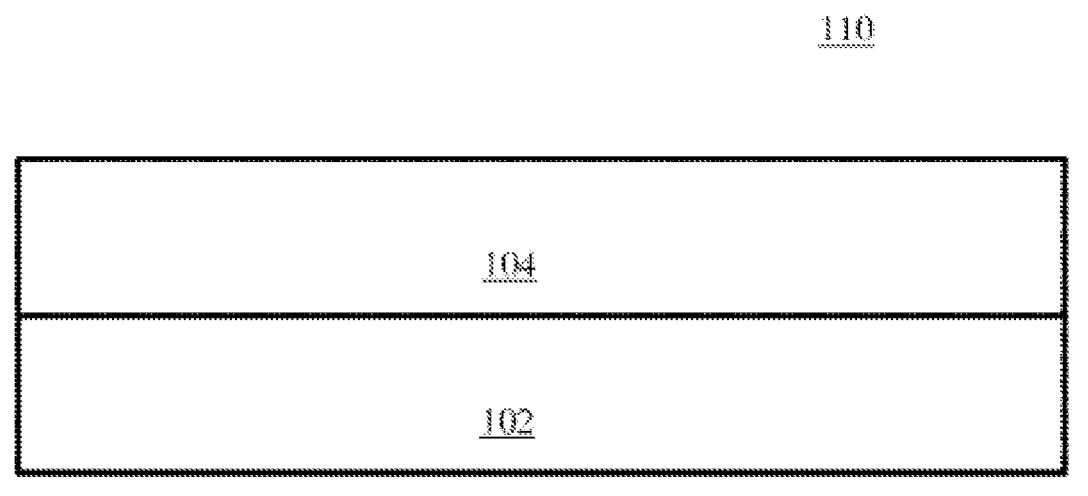

FIG. 1A depicts an embodiment of a reconstitutable sheet 100 comprising a dehydrated substance 102. FIG. 1B depicts another embodiment of a reconstitutable sheet 110 comprising a first layer of a dehydrated substance 102 and a second layer of a dehydrated substance 104. Although only two layers are shown in FIG. 1B, any number of layers can be present.

Each layer may include the same or different dehydrated substances. For instance, referencing FIG. 1B, first layer 102 may be comprised of a dehydrated substance comprising coffee and second layer 104 may be comprised of a dehydrated substance comprising milk. First layer 102 and second layer 104 may be comprised of a dehydrated substance comprising flavor.

In some embodiments, each layer can be comprised of active or inactive ingredients. Moreover, each layer can be comprised of the same or different active or inactive ingredients. For instance, referencing FIG. 1B, the first layer of a dehydrated substance 102 can be comprised of milk and a second layer of a dehydrated substance can be comprised of a nutritional supplement or an active ingredient for therapeutic or medicinal purposes.

The active ingredients may include supplements and the supplements may include those suitable for nutrition, flavor enhancement, and/or medicinal purposes that can be ingested. Nutritional supplements can include a vitamin, a mineral, a protein, a probiotic, a fiber, an amino acid, and other dietary supplements. For example, vitamins may include any suitable vitamin that can be ingested, such as vitamin A, B, C, D, E, B12, vitamin A palmitate, Vitamin D2 and the like found in a typical over the counter multivitamin. Minerals may include iron, magnesium, potassium, and the like found in a typical over the counter multivitamin. A protein may include whey protein or a plant based protein. In some instances, the active and inactive ingredients may include pharmaceuticals, such as acetylsalicylic acid, potassium citrate, acetaminophen, ibuprofen, etc., as well as beverage and food items.

In order to incorporate active and inactive ingredients into the reconstitutable sheet, the active ingredients may be microencapsulated, dispersed, suspended and/or solubilized into a reconstitutable sheet, such as carrageenan, agar-agar, xanthum gum, guar gum, or other such material. In some instances, a small amount of preservative, such as ascorbic acid may be included in the composition.

The reconstitutable sheet may include additional components to alter the properties of the reconstitutable sheet. Such properties may include the following: Structural support of the reconstitutable sheet; release control of an active ingredient, such as a supplement from the reconstitutable sheet as it dissolves and/or disperses; shelf stability of the active ingredient; manipulation of the reconstitutable sheet or formed reconstitutable sheet during manufacture; appearance of the reconstitutable sheet; and taste of the reconstitutable sheet.

Other additional components in the reconstitutable sheet can include one or more of polymers, water-soluble polymers, binding agents, defoamers, flow aides, flavor enhancers, natural flavors, rheological modifiers, humectants, waxes, and the like and other components that are utilized to print a layer from an ink, such as dyes, pigments, etc. Exemplary polymers may be water soluble, water swellable or water insoluble. They may include, but are not limited to, agar-agar, carrageenan, ethyl cellulose, polyacrylic acid, methyl cellulose, polyethylene oxide, guar gum, xanthum gum, gum Arabic, polyvinyl alcohol, sodium alginate, water-soluble hydroxypropylmethyl cellulose, hydroxyethyl cellulose, hydroxypropyl cellulose, polyvinyl pyrrolidone, carboxymethyl cellulose, sodium carboxy methyl cellulose, methyl cellulose, polyvinyl alcohol, xanthum gum, various starches such as corn starch, rice starch, etc.

Defoamers may include, but are not limited thereto, alcohol or polysiloxane type defoamers both in water and alcohol. Flow aids may contain food grade glycols and polyglycols, xylitol, glycerol.

Binding agents may include, but are not limited to, agar-agar, carrageenan, flours (e.g., all purpose flour, almond flour, rice flour), gluten, buckwheat, teff, amaranth, seeds (e.g., flaxseeds, chia seeds, psyllium husks), purees (e.g., sweet potato, banana, apple, pumpkin, bean, zucchini, carrot, coconut, butter (e.g., dairy butter, non-dairy butter), starches (e.g., arrowroot, tapioca, potato starch, corn starch), powders and/or additives (e.g., agar-agar, xanthum gum, guar gum), aquafaba, honey, eggs, gelatin, pectin, evaporated milk, and oatmeal.

Waxes may include, but are not limited thereto, paraffin or carnauba waxes.

Humectants may include, but are not limited thereto, all molecular weight polyethylene glycols and propylene glycols, xylitol, glycerol sugars and starches. Rheology modifiers may include, but are not limited thereto, sodium salts of an acrylic polymer, various starches and gums.

Colorants may also be used to tint dehydrated substances to specific colors. In this regard, each layer may include its own color or the same color.

Natural flavors may include, but are not limited to, the natural essence or extractives obtained from natural substances, such as orange, lemon, lime, grapefruit, mandarin, pineapple, strawberry, grape, banana, melon, apple, peach, vanilla, coffee, cocoa, chocolate, beans, almonds, peanuts, cola, guarana, peppermint, spearmint, ginger, garlic, onion, pepper, mustard, allspice, cinnamon, nutmeg, celery, laurel, milk, butter, cheese, yogurt, wine, sherry, brandy, rum, whiskey, ginjo, beef, chicken, pork, shrimp, crab, and seafood. The primary purpose of the natural flavor component is to provide or add flavor of a desired type.

In some embodiments, the reconstitutable sheet can include one or more fortifying ingredients. Non-limiting examples of fortifying ingredients include vitamins, minerals, antioxidants, amino acids, essential oils, polyphenols, calcium carbonate, sunflower lecithin, sea salt, proteins, fats, carbohydrates, colorings, flavorings, and the like.

In some embodiments, the reconstitutable sheet also includes calcium carbonate. Calcium carbonate can be incorporated in a range from about 0.01 mg to about 50 mg, 50 mg to about 100 mg, about 100 mg to about 200 mg, about 200 mg to about 300 mg, about 300 mg to about 400 mg, about 400 mg to about 500 mg, about 500 mg to about 600 mg, about 600 mg to about 700 mg, about 700 mg to about 800 mg, about 800 mg to about 900 mg, and about 900 mg to about 1000 mg.

In some embodiments, the reconstitutable sheet can include sunflower lecithin. Sunflower lecithin can be incorporated in a range from about 0.0001% to about 0.001%, 0.001% to about 0.01%, 0.01% to about 0.05%, about 0.05% to about 0.1%, about 0.1% to about 0.5%, about 0.5% to about 1%, about 1% to about 2%, about 2% to about 3%, about 3% to about 4%, about 4% to about 5% w/v.

In some embodiments, the reconstitutable sheet can include sea salt. Sea salt can be incorporated in a range from about 0.0001% to about 0.001%, 0.001% to about 0.01%, 0.01% to about 0.05%, about 0.05% to about 0.1%, about 0.1% to about 0.5%, about 0.5% to about 1%, about 1% to about 2%, about 2% to about 3%, about 3% to about 4%, about 4% to about 5% w/v.

In some embodiments, the reconstitutable sheet can include guar gum and/or gellan gum. Guar gum and/or gellan gum can be incorporated a range from about 0.0001% to about 0.001%, 0.001% to about 0.01%, 0.01% to about 0.05%, about 0.05% to about 0.1%, about 0.1% to about 0.5%, about 0.5% to about 1%, about 1% to about 2%, about 2% to about 3%, about 3% to about 4%, about 4% to about 5% w/v.

In some embodiments, reconstitutable sheets may include a support substrate. The support substrate, also referred to as a support structure, may provide a supportive base on which the dehydrated substance or one or more layers of the dehydrated substance may be positioned. In this regard, the one or more layers of the reconstitutable sheet may not be capable of maintaining their shape and/or supporting their own weight. As such, during handling, storing, and/or transportation the one or more layers may break apart or otherwise deform, and/or sag. To prevent this from occurring, a support substrate may be used to provide structural support to layers disposed therein.

For instance, FIG. 2A depicts an embodiment of a reconstitutable sheet 200 including a support substrate 202 encompassing the first layer 201. In some instances, support substrates may be used for reconstitutable sheets even if they are capable of maintaining their shape and/or supporting their own weight.

Figure 2B:
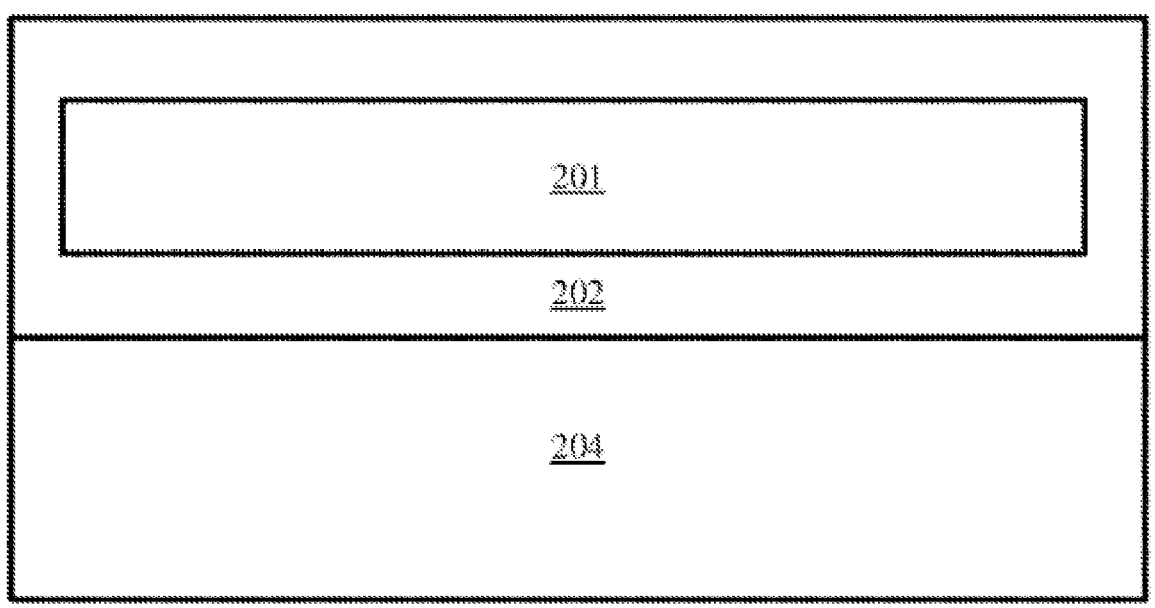

Another embodiment of a reconstitutable sheet including a support structure is shown in FIG. 2B. In this embodiment, the reconstitutable sheet 210 includes a first layer 201 completely encapsulated by the support substrate 202. A second layer 204, which may be, on its own, structurally sound, is disposed on a surface of the support substrate 202, such that the second layer 204 is not encapsulated by the support substrate 202. In instances where the second layer 204 does not require structural support, a smaller support structure 202 may be used in the reconstitutable sheet 210. As such, the amount of material to produce the support structure 202 may be reduced.

Figure 2C:
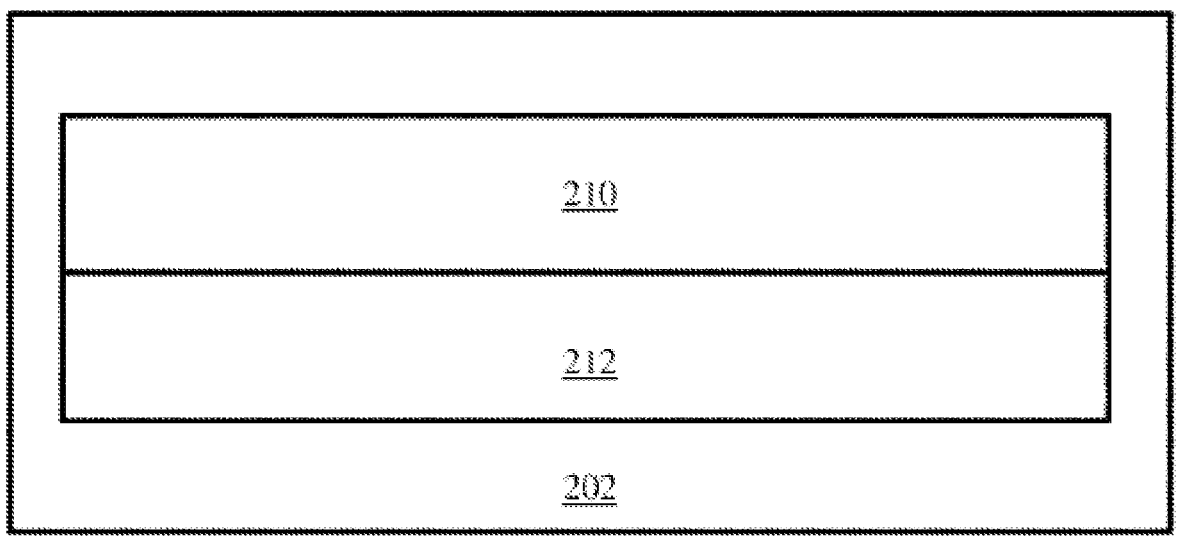

In contrast with the embodiment of FIG. 2B, FIG. 2C shows a reconstitutable sheet 220 which has two layers 210 and 212 fully encapsulated by a support structure 202.

Figure 2D:
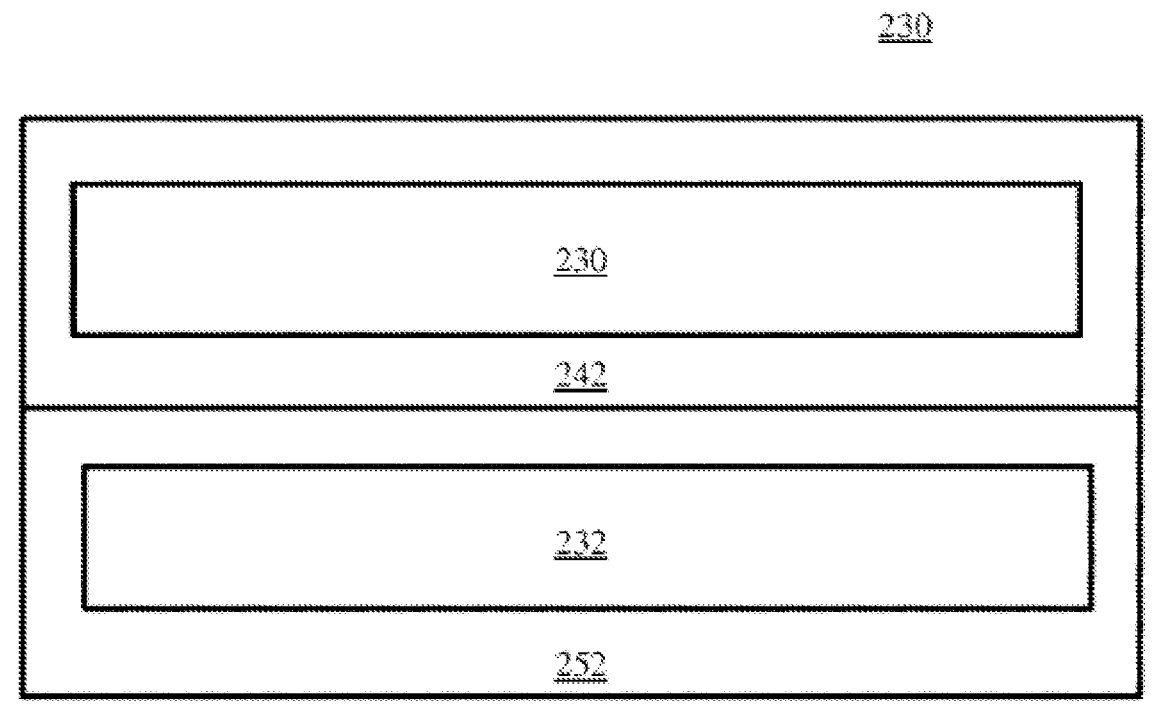

FIG. 2D depicts another embodiment of a reconstitutable sheet 230 including the first layer 230 encapsulated by a first support substrate 242 and the second layer 232 encapsulated by a second support substrate 252. The support substrate 242 may be suitable to meet the shelf life criteria of the first layer 230, which may include one or more active ingredients, second layer 232, which many include one or more active ingredients, and the second support substrate 252 may be suitable to meet the shelf life criteria of the second layer 232.

In some embodiments, a layer may be deposited or otherwise positioned on support substrate, or vice-versa. As such, only a portion or portions of a layer may be disposed on a support structure. Further, a layer may be encapsulated or disposed on more than one support substrate. For instance, a layer may be disposed between support substrates, i.e., one support substrate atop active layer, and another support substrate below the layer.

In some embodiments, the support structure may be comprised of a dehydrated substance and/or any of the other additional components described herein. In this regard, the support substrate may be dissolvable or non-dissolvable. In some embodiments, the support structure may be comprised of a dissolvable film, such as manufactured by Aquapak, Monosol, Nippon-gohsei, etc. In some embodiments, a release liner or paper may be used as a support substrate. As used herein, a "release paper" or "release liner" refers to a paper with a release agent coated to allow a layer(s) formed thereon to be released from the paper. A release liner may be paper, polyester, plastic, or other such material with or without a release agent coating, which allows a layer(s) formed thereon to be released.

In some embodiments, the support substrate may be configured to provide a protective layer to maintain shelf stability of the reconstitutable sheet and/or provide a packaging for the reconstitutable sheet. In this regard, the support substrate can be tailored to the particular need of the application of the reconstitutable sheet. For instance, when the support substrate is to function as a barrier layer to moisture and/or, in some instances as a packaging material, the support substrate may include, but is not limited to, wax, polyester, silicone, and desiccants, such as rice starch or other starches which block a predetermined amount of moisture from reaching layers encompassed by the support substrates (although such materials may be used even in other configurations of the support structure). In one embodiment, the support substrate could be two or more layers, such as a hydrophobic layer and a desiccant layer. In this regard, hydrophobic layer may overlay the desiccant layer, which is closed to the layer. In operation, the hydrophobic layer limits moisture vapor transmission to the layers encompassed by the support substrate. However, should there be a hole or defect in the hydrophobic layer, the desiccant layer can absorb moisture that gets through the hydrophobic layer. The support substrate, although hydrophobic, may still dissolve when immersed in a certain amount of liquid, such as a beverage or in a user's mouth upon ingestion.

In some embodiments, the support substrate may be a hydrophobic coating to ensure that the surface of the dehydrated substance or layer(s) of dehydrated substances do not get tacky. For instance, polyvinyl alcohol (PVOH), starch, and/or other edible and safe binders can be modified to give the desired surface feel, dissolution rates and taste profiles necessary to make a stable product that can go through normal handling.

In some embodiments, the support structure, such as a release paper or release liner, may be configured to prevent the layers from breaking or otherwise becoming deformed. In some embodiments, the support structure can be designed to withstand extreme temperatures.

In some embodiments, the reconstitutable sheet may be printed, cast or coated onto the cast substrate using any suitable method known in the art such as knife coating, reverse roll coating, spray coating, slot die coating, various other coating methods, gravure or microgravure coating, offset coating, hot melt coating, curtain coating, extruding, coextruding, kiss coating, transfer roll coating, rotary screen, flat screen, hot stamped, cold stamped, thermal transferred, flexographic printed or coated, cold laminated or hot laminated. Any of the layers formed directly on the cast substrate could be a film forming or non-film forming layer that may be dried in between formation of subsequent layers or may have another layer applied while still wet. These layers may impart multiple characteristics to subsequent other layers.

In some embodiments, the reconstitutable sheet is processed via a printing method. Non-limiting examples of printing methods include stencil printing, screen printing, rotary screen printing, flexography, offset gravure, ink jet, bubble jet, dry toner, ribbon transfer, powder coating, spray coating, roll coating, reverse roll coating, slot die coating, hot and/or cold laminating, knife coating, sintering, padding, curtain coating, and the like. In this regard, printing techniques are understood to cover coating techniques.

In some embodiments, a printing method using an ink may be utilized to make the one or more layers of dehydrated substance. In some embodiments, the ink may be aqueous or solvent based. In some embodiments, the ink may be ultraviolet (UV) curable, electron beam (EB) curable, thermally curable, cold curable, ambient catalyzed, ambient cross-linked, and the like. In some embodiments, the ink may be edible and/or dissolvable based on the desired application. The ink may include the various components of the active layer, support substrate, and barrier layer discussed herein.

Figure 3:
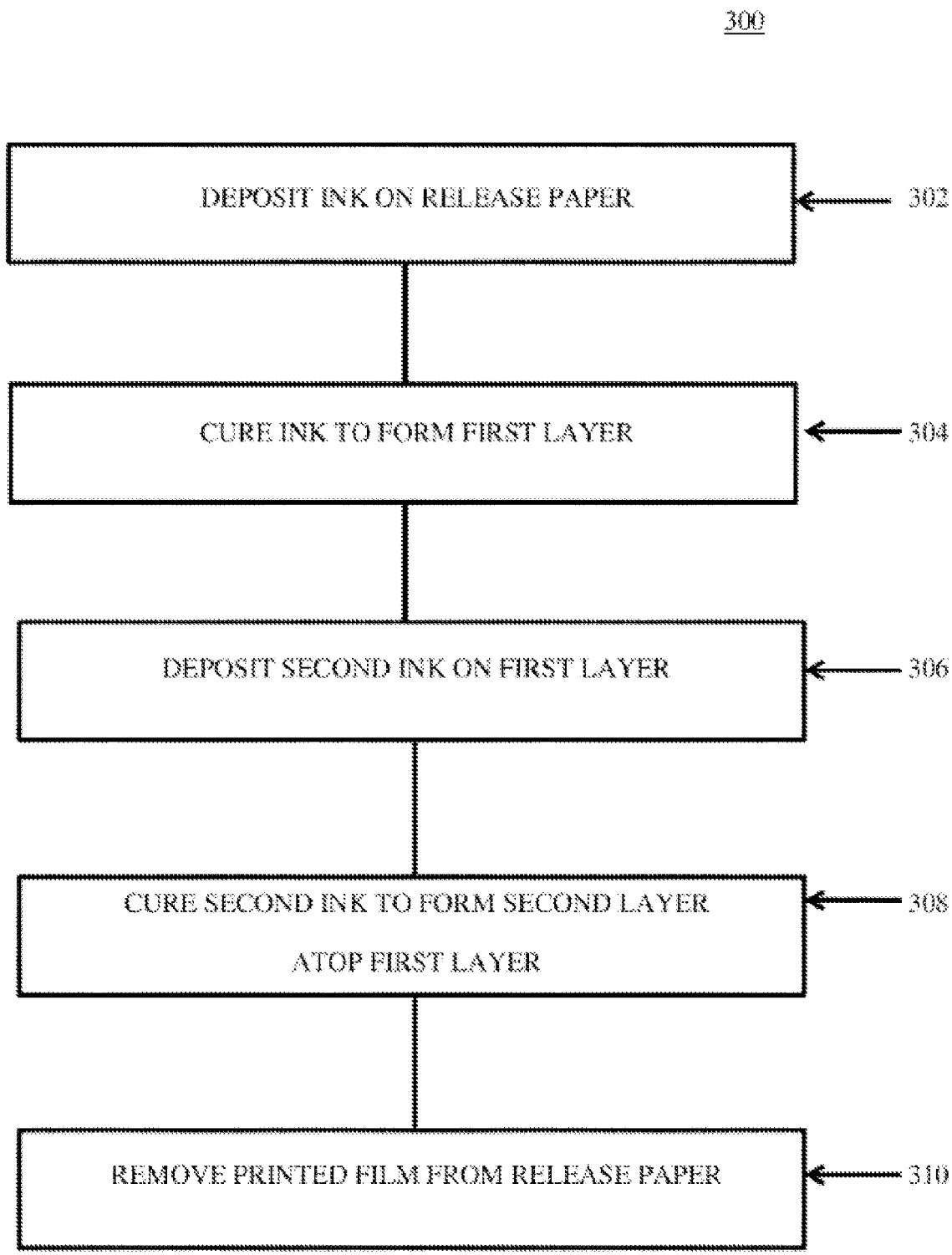
FIG. 3. A flow chart for a method of making a reconstitutable sheet in accordance with some embodiments of the present application. The method including step 302, depositing ink on release paper, step 304, curing ink to form first layer, optional step 306, depositing second ink on first layer, optional step 308 curing second ink to form second layer atop first layer, and step 310, removing printed film (reconstitutable sheet) from release paper.

The printing method may vary depending on the type of reconstitutable sheet being made. FIG. 3 depicts a flow chart for a method 300 of making a dehydrated substance in accordance with an embodiment of the present application. The method 300 is described concurrently with fabrication steps depicted in FIGS. 4A-E.

Figure 4A:
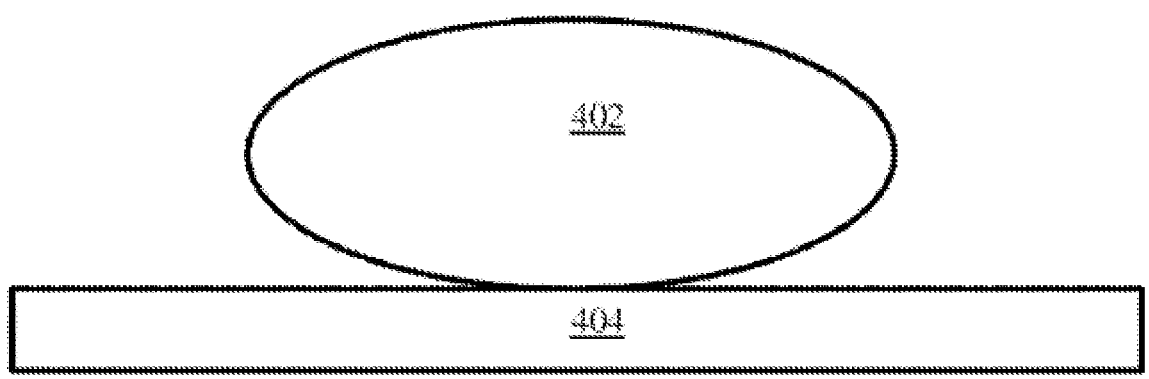
FIGS. 4A-4E. Stages of processing in accordance with the method described in FIG. 3. 4A) ink 402 is deposited on release paper 404. 4B) ink 402 is cured to form a first layer 406. 4C) a second ink 408 is optionally deposited atop the first layer 406. 4D) the second ink 408 is optionally cured to form a second layer 410. Optionally, additional layers may be added atop the second layer to achieve the desired composition. 4E) a finished reconstitutable sheet 412 is removed from release paper 404. Alternatively, the release paper 404 may itself be part of the printed composition.
Figure 4B:
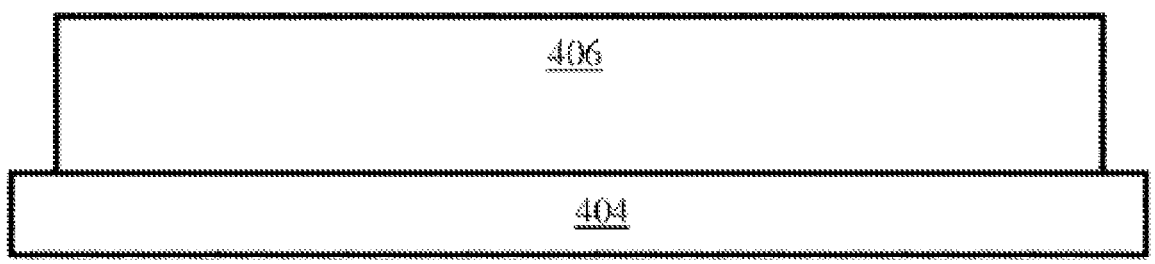
Figure 4C:
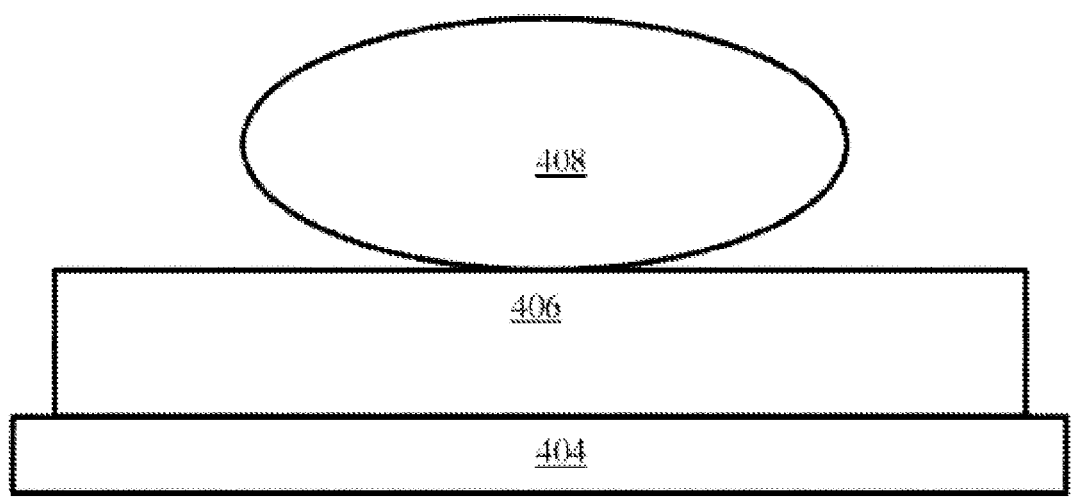
Figure 4D:
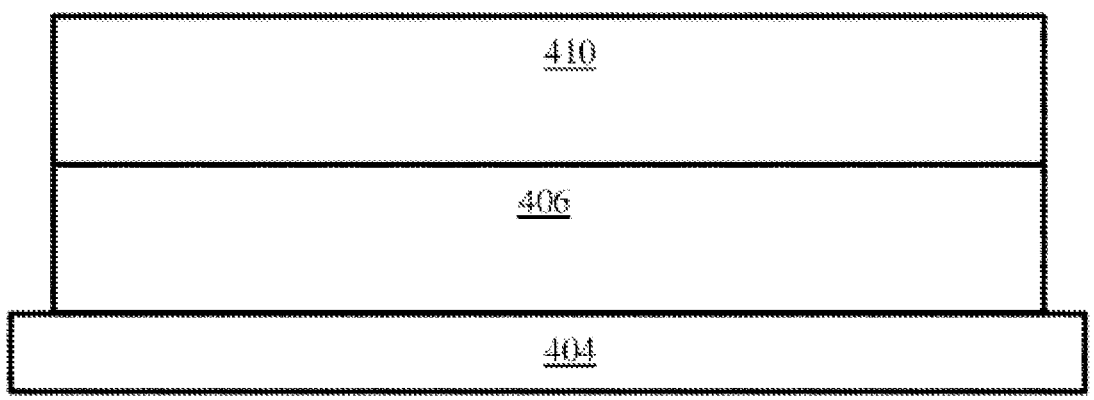
Figure 4E:
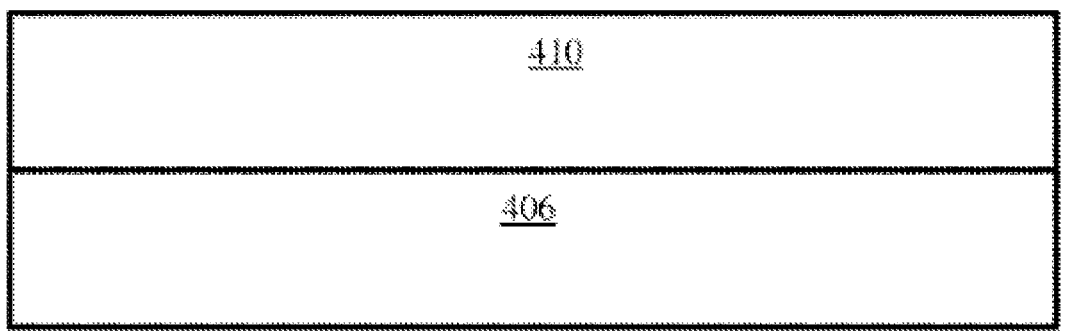

At 302, an ink 402 is deposited on a release paper 404 (shown in FIG. 4A). At 304, the ink 402 is cured to form a first layer 406 (shown in FIG. 4B). The first layer 406 may be an active layer or a support substrate, such as those described herein. Optionally, at 306, a second ink 408 is deposited atop the first layer 406 (shown in FIG. 4C). At 308, the second ink 408 is cured to form a second layer 410 (shown in FIG. 4D). The second layer may be an active layer, a barrier layer, or a support substrate, such as those described herein. Optionally, additional layers, such as active layers, inactive layers, or support substrates, may be added atop the second layer to achieve a desired dehydrated substance. At 310, a finished dehydrated substance 412 is removed from the release paper 404 (shown in FIG. 4E). Alternatively, the release paper 404 may itself be an exemplary support substrate and part of the dehydrated substance.

Figure 5:
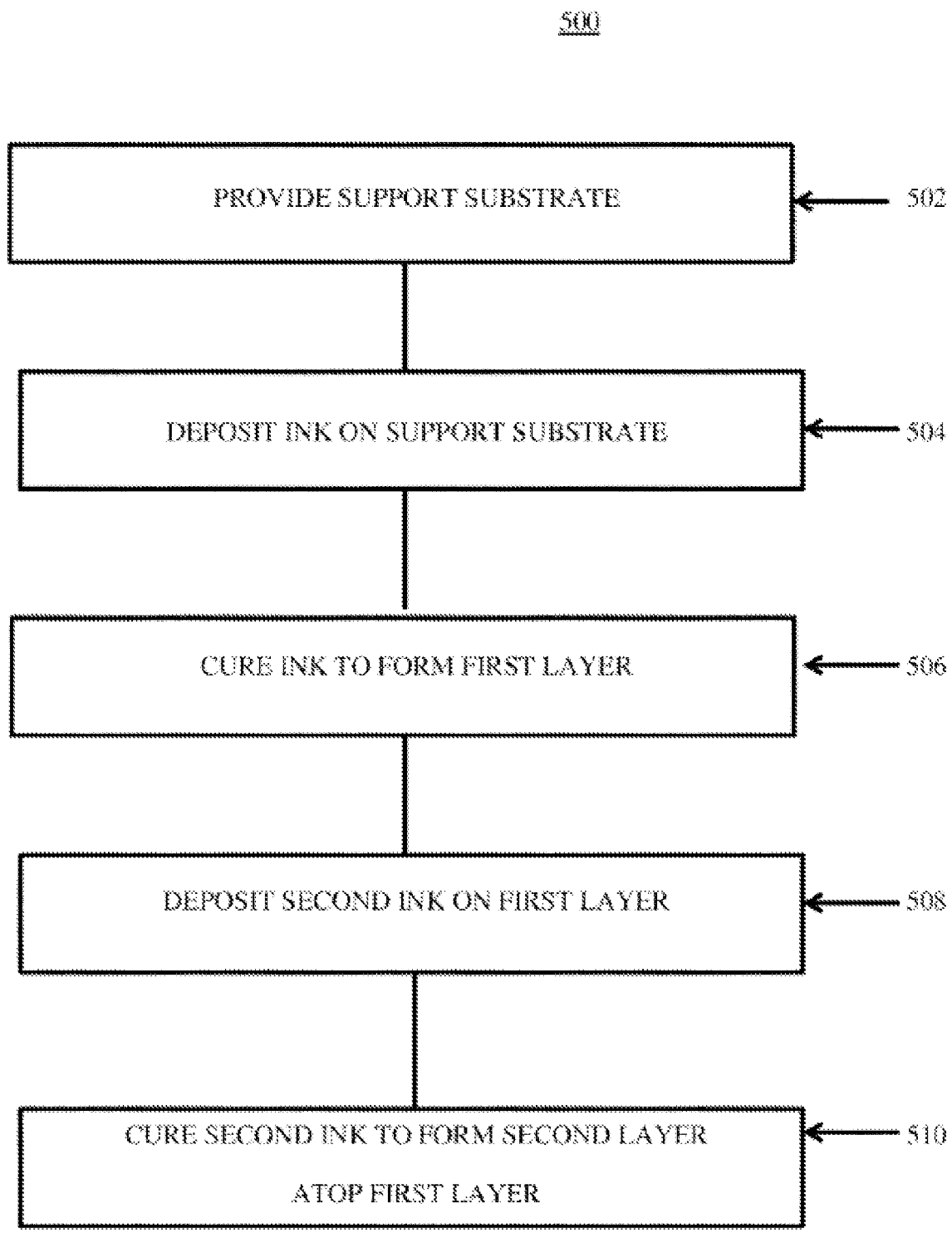
FIG. 5. A flow chart for a method 500 of making a reconstitutable sheet in accordance with some embodiments of the present application. The method including step 502, providing support substrate, step 504, depositing ink on support substrate, step 506, curing ink to form first layer, step 508, depositing second ink on first layer, and step 510, curing second ink to form second layer atop first layer.
Figure 6A:
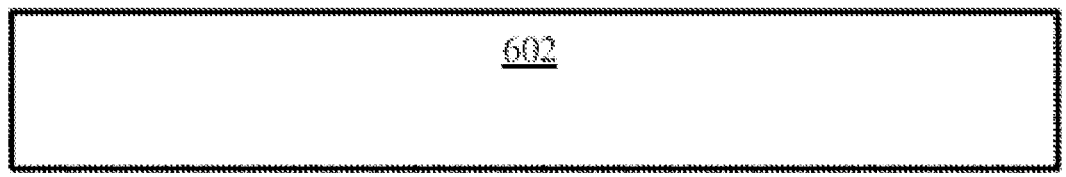
FIGS. 6A-6E. Stages of processing in accordance with the method described in FIG. 5. 6A) a support substrate 602 is provided. 6B) an ink 604 is deposited on the support substrate 602. 6C) the ink 604 is cured to form a first layer 606, wherein the first layer may be an inactive or active layer or support substrate. 6D) a second ink 608 is deposited on the first layer 606. 6E) a second ink 608 is cured to form a second layer 610. Optionally, any number of additional layers may be provided to form a reconstitutable sheet.
Figure 6B:
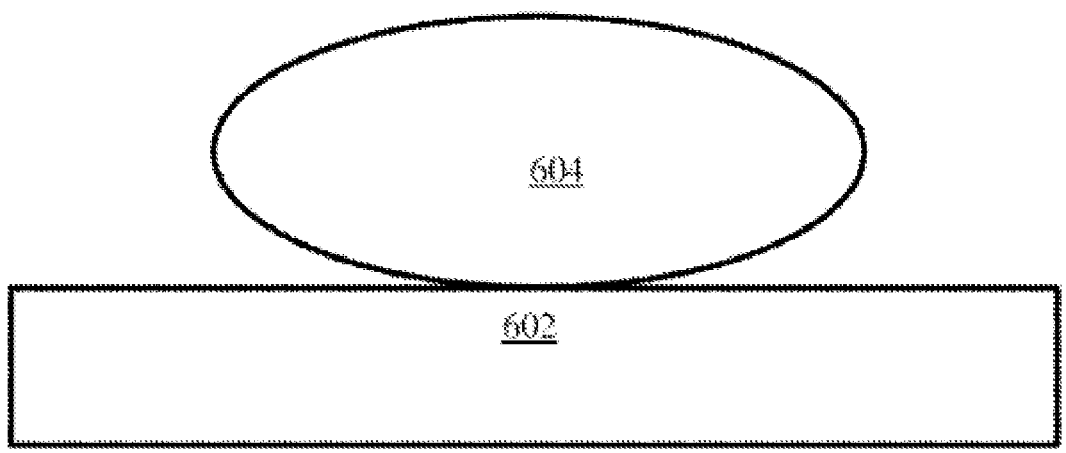
Figure 6C:
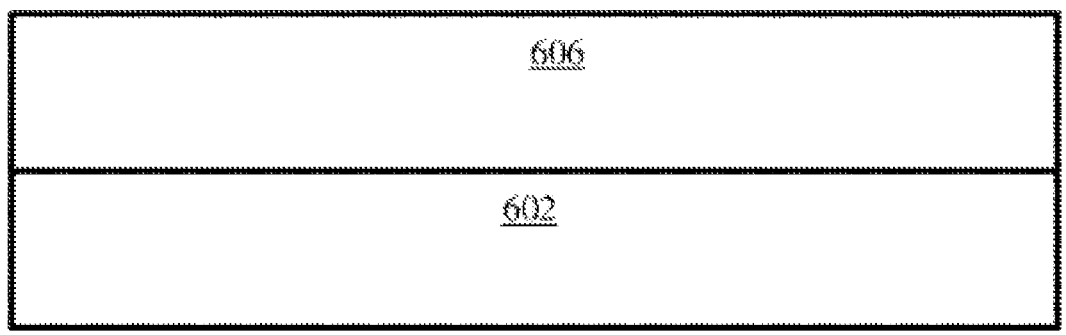
Figure 6D:
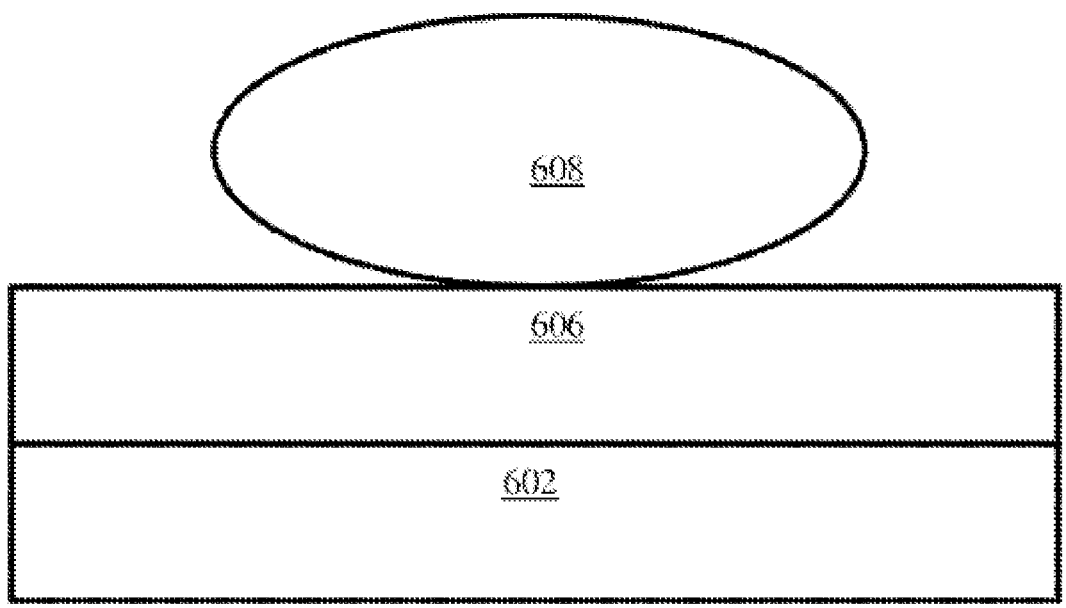
Figure 6E:
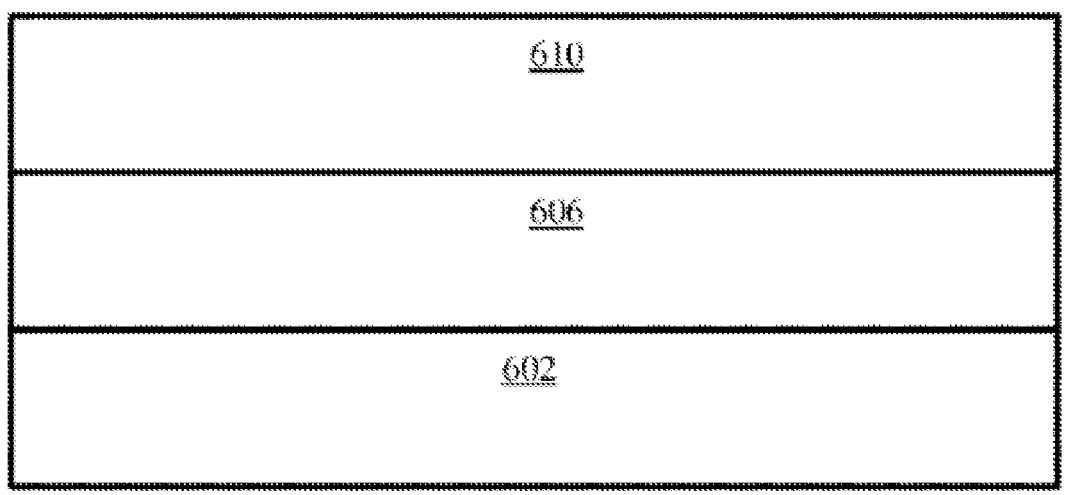

FIG. 5 depicts a flow chart for a method 500 of making a reconstitutable sheet in accordance with an embodiment of the present application. The method is described concurrently with fabrication steps depicted in FIGS. 6A-E. At 502, a support substrate 602 is provided (shown in FIG. 6A). The support substrate 602 may be pre-manufactured by any suitable technique including printing and/or casting. At 504, an ink 604 is deposited on the support substrate 602 (shown in FIG. 6B). At 506, the ink 604 is cured to form a first layer 606 (shown in FIG. 6C), where the first layer may be an active layer or support substrate as discussed herein. At 508, a second ink 608 is deposited on the first layer 606 (shown in FIG. 6D). At 510, the second ink 608 is cured to form a second layer 610 (shown in FIG. 6E), where the second layer may be an active layer or a support substrate as discussed herein. Optionally, any suitable number of additional layers may be provided to form a dehydrated substance.

In some embodiments, a reconstitutable sheet is formed with an ink containing a first dehydrated substance, which may be knife coated onto a polyester support substrate. Additional layers of dehydrated substances may each be screen printed, in a layered configuration on the first layer of dehydrated substance.

Figure 7:
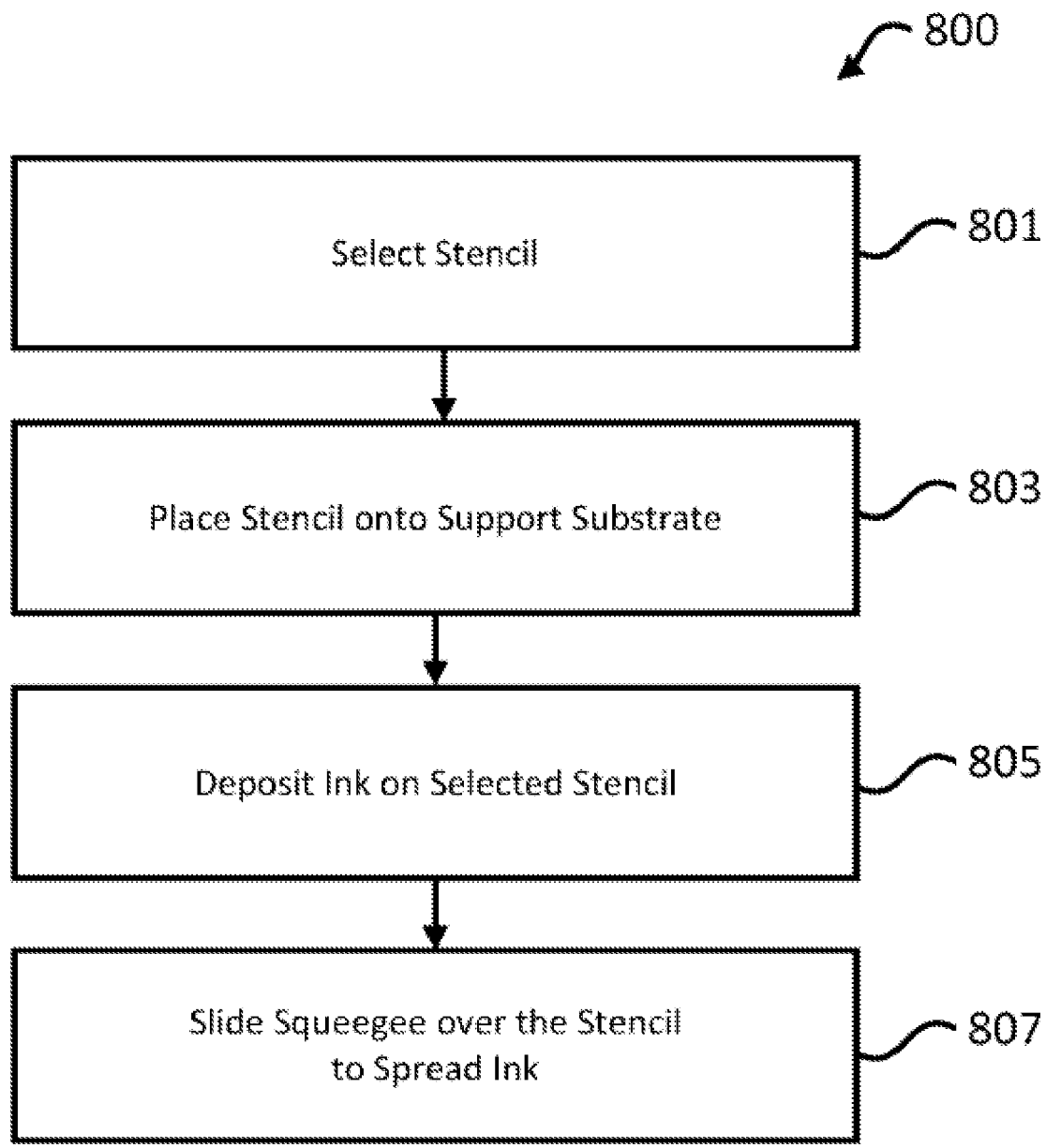
FIG. 7. A flow chart for a method of stencil printing an ink onto a support substrate in accordance to some embodiments of the present invention. The method including step 801, selecting a stencil, step 803, placing a stencil onto a support substrate, step 805, depositing ink onto the selected stencil, and step 807, sliding a squeegee over the stencil to spread the ink.

FIG. 7 illustrates a flow diagram for stencil printing an ink onto a support substrate. As illustrated by block 801, a stencil is selected. Then stencil is then placed on the support substrate, as illustrated by block 803. The ink may then be deposited onto the stencil, as illustrated by block 803 and a squeegee may be slid over the surface of the stencil to spread the ink into voids in the stencil, as illustrated by block 805.

In some embodiments, the stencil may be constructed from stainless steel, or other materials, such as plastics, glass, other metals, etc. For instance, the stencil may be constructed from medical grade 316 stainless steel.

In some embodiments, the thickness of the stencil may be selected based on the thickness of the layer to be printed. This is because the voids in the stencil are used to form the layer. In this regard, the ink that is deposited onto the stencil, as shown in block 803, is pulled into the voids by a squeegee sliding across the surface of the stencil, as illustrated by block 805. When hardened, the ink within each void forms a layer at or about the thickness of the stencil.

In some embodiments, the thickness of the stencil may be dependent on the gauge of the stainless steel selected for the stencil. In some embodiments, the stainless steel may be 24 gauge stainless steel that is $\frac{1}{40}$ of an inch thick. In some embodiments, higher or lower gauge stainless steel may also be selected for the stencil to achieve different thicknesses. In some embodiments, a stencil made from 18 gauge stainless steel or 20 gauge stainless steel would be about $\frac{1}{20}$ or $\frac{3}{80}$ of an inch thick, respectively. In some embodiments, a stencil made from 28 gauge stainless steel would be about $\frac{1}{64}$ of an inch thick.

In some embodiments, the stencil may include a combination of materials such as, for example, stainless steel and aluminum. Further, the thickness of a stencil may be varied. In some embodiments, one section of the stencil may be $\frac{3}{80}$ of an inch and another portion $\frac{2}{80}$ of an inch.

In some embodiments, voids may be formed in the stencil. The voids formed in the stencil correspond to the locations where a printed layer will be formed. In this regard, the voids transverse the entirety of the material, thereby creating a void where the voids are present.

Figure 8:
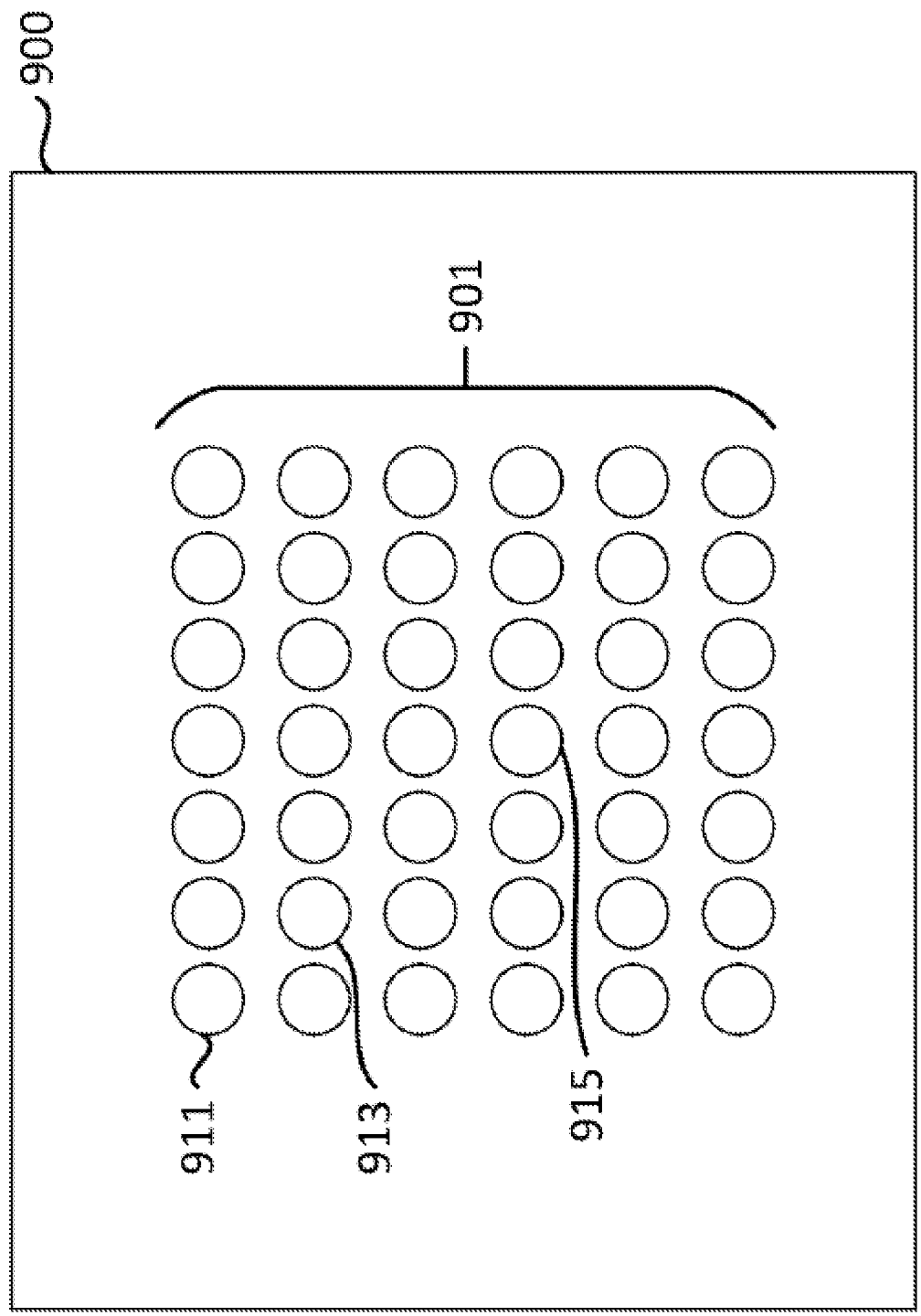
FIG. 8. An example stencil 900 formed from 24-gauge stainless steel. The stencil 900 includes a set of voids 901 that create a 7×6 pattern in the stencil 900. During printing, the layers of ink will be formed on the support substrate under each hold of the set of voids 911, 913, 915, etc.

FIG. 8 illustrates an example stencil 900 formed from 24 gauge stainless steel. The stencil 900 includes a set of voids 901 that create a 7×6 pattern in the stencil 900. During the printing of a layer using stencil 900, layers of ink will be formed on the support substrate under each hole of the set of voids, including voids 911, 913, 915, etc. Although FIG. 8 illustrates a 7×6 pattern of circular voids, the voids may be in any shape and any pattern. In some instances, the voids on a stencil may be different sizes and shapes.

In some embodiments, each stencil may be polished to allow the squeegee to slide evenly and smoothly across the surface. Moreover, the area where the voids meet the surface of the stencil may be rounded to reduce the possibility of chipping, or otherwise damaging the squeegee when the squeegee passes over the void.

Figure 9A:
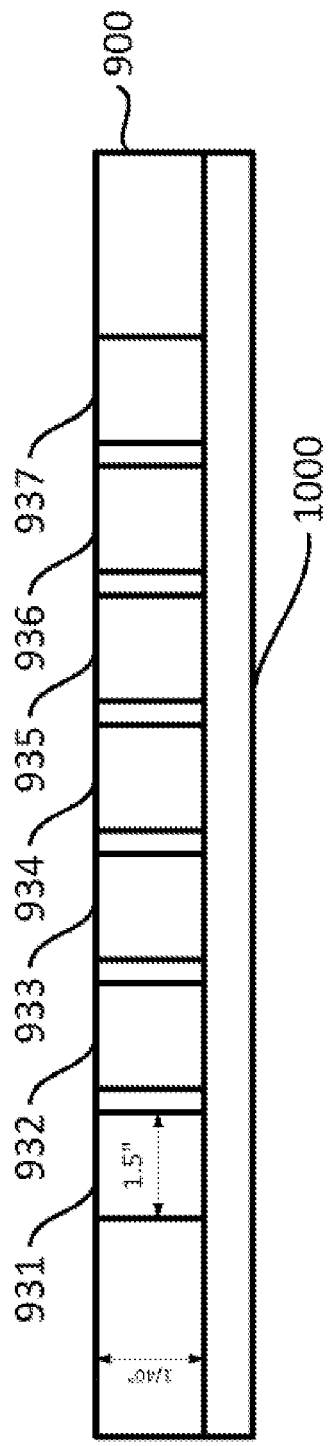
FIGS. 9A-9C. A cutaway side view of a stencil 900 during the printing of a layer. 9A) stencil 900 includes voids 931-937. Each void is 1.5" in diameter. The stencil 900 is 1/40 of an inch thick. Stencil 900 is positioned over a support substrate 1000. 9B) an ink 1010 being deposited onto the stencil 900. 9C) a squeegee 1012 being moved along the surface 990 of stencil 900 in the direction illustrated by arrow 1080. As the squeegee moves along the surface 990, the ink 1010 fills the voids 931-937.
Figure 9B:
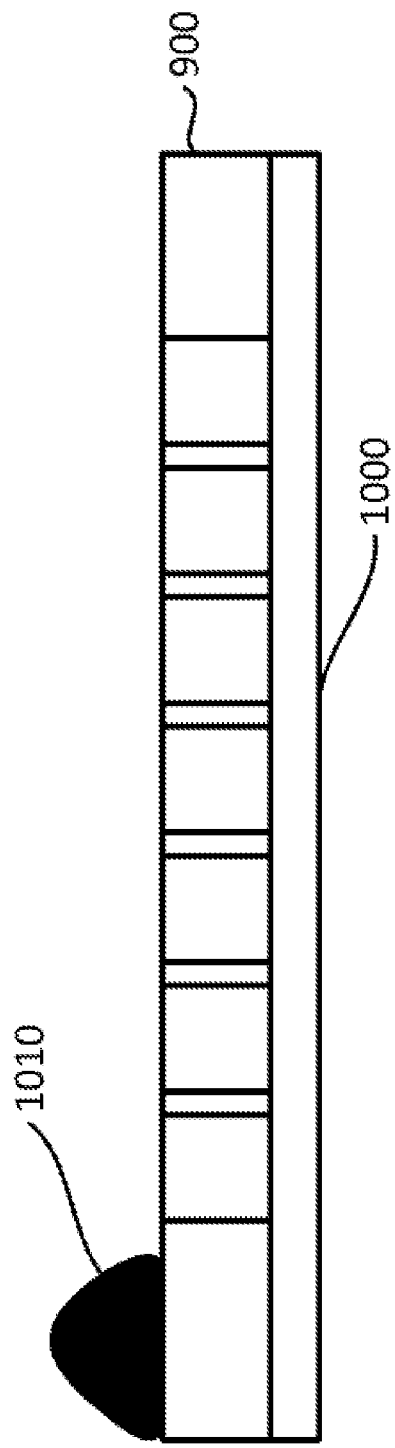
Figure 9C:
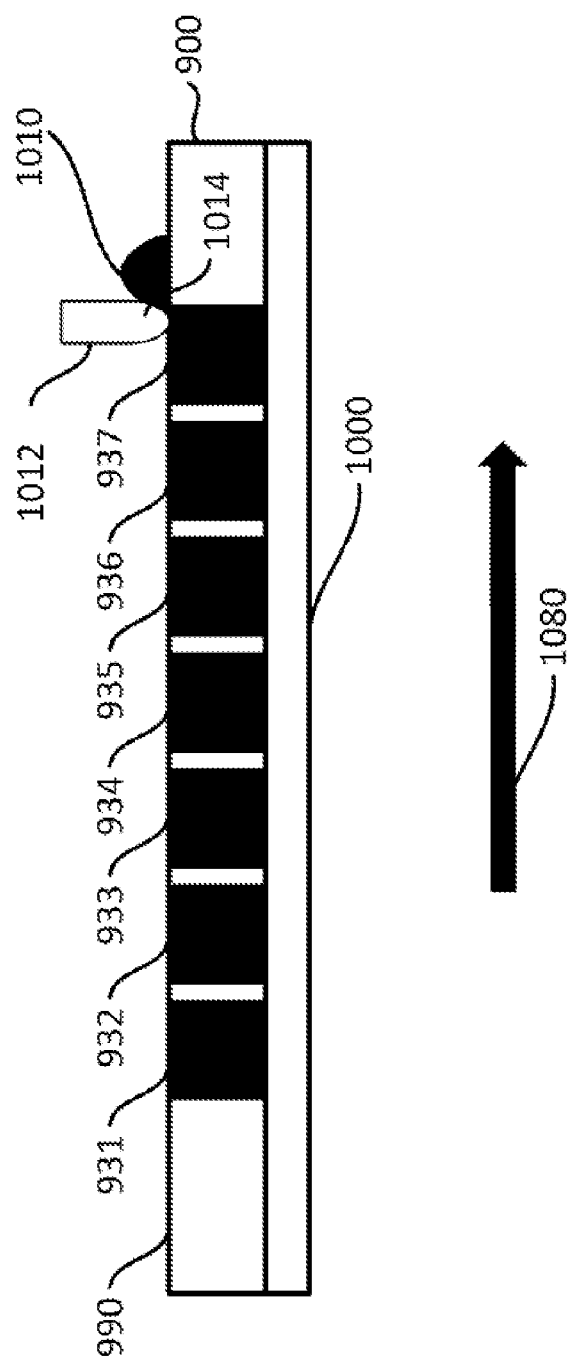

FIGS. 9A-9C show an exploded side, cutaway view of a stencil 900 during the printing of a layer. As shown in FIG. 9A, stencil 900 includes voids 931-937. Each void is 1.5" in diameter. The stencil 900 is constructed from 24 gauge medical grade 316 stainless steel, and is thus, $\frac{1}{40}$ of an inch thick. Consistent with block 803, the stencil 900 is positioned over a support substrate 1000.

FIG. 9B illustrates an ink 1010 being deposited onto the stencil 900, consistent with block 805 of FIG. 7. FIG. 9C illustrates a squeegee 1012 being moved along the surface 990 of stencil 900 in the direction illustrated by arrow 1080. As the squeegee moves along the surface 990, the ink 1010 fills the voids 931-937. The tip 1014 of the squeegee is shown as having a rounded edge, referred to as a bullnose. Alternatively, the squeegee may have other edges, such as a straight edge. The tip 1014 of the squeegee may be made of 60, 70, or 80 durometer polyurethane. The polyurethane may be medical grade and FDA approved.

In some embodiments, the printed layers of ink may be heated in an oven after being printed. For instance, the substrate 1000 and printed layers of ink may be placed on a tray and inserted into a batch oven where the substrate and printed layers of ink may be heated. In another example, the substrate and printed layers of ink may be placed on a conveyor of a conveyor oven. The substrate 1000 and printed layers of ink may then be moved on the conveyor through the conveyor oven where they may be heated. In each example, the substrate 1000 and printed layers of ink may be heated between 30 seconds to 15 minutes in heat ranging from 100-350 F, but preferably between 1 minute and 10 minutes in heat ranging from 150-300 F, and more preferably between 2-5 minutes between 200-250 F.

Figure 10:
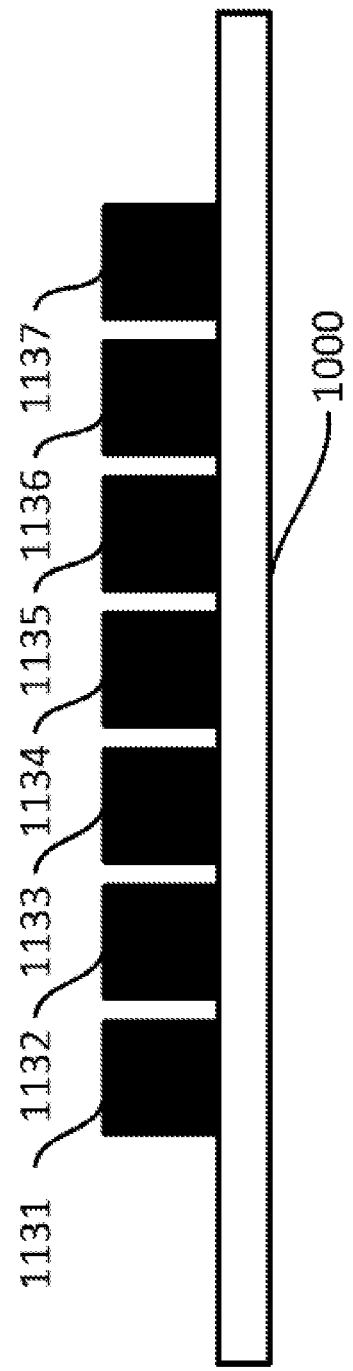
FIG. 10. Layers 1131-1137 remaining on the substrate after the stencil 900 is removed from the substrate.

FIG. 10 illustrates the layers 1131-1137 that remain on the substrate after the stencil 900 is removed from the substrate. The stencil 900 may be removed before or after heating of the layers 1131-1137. At this stage in production, additional layers may be printed on to the layers 1131-1137 by placing additional stencils over the layers and printing new layers onto the existing layers. Additionally, or alternatively, the layers may be removed from the substrate manually or through use of a robot. The removed layers may each be considered a reconstitutable sheet. In other embodiments, the layers may not be removed from the substrate. Rather, the substrate may be cut such that each cut portion includes one or more layers.

In some embodiments, the printing method may be ink jet printing. Ink jet printers print approximately 100-micron droplets to make their pattern. It is not one continuous film, as occurs with stencil printing. Moreover, the particles within a 100-micron droplet have to be less than 50 microns to go through the head of the inkjet printer, and the particles are typically below 5 microns. In contrast, the particle size of the ingredients within the stencil printing ink can range from 10 microns to greater than 200 microns. Thus, it would take numerous passes of an ink jet to deposit a similar amount of active ingredient that can be deposited in a single layer by stencil printing.

In some embodiments, the printing technique is flexography. In flexography printing, a very thin (e.g., low viscosity) ink is required. Thus, it would take a number of printings to equal a 24-gauge stencil printed layer. The number of printing would be dependent on the amount of solids within the ink and the type of anilox (i.e., roller,) that is used to apply the ink. As flexography uses a roller, small and detailed layers would not be practical.

A flexo printed decorative film may be applied to a polyester release coating. The polyester release coating may then be overlaid on a portion, or all of the, reconstitutable sheet. The flexo printed decorative film may then be laminated, through hot or cold lamination, to the reconstitutable sheet.

In some embodiments, decorative designs or other such indicia, such as words, pictures, measurement lines and dose demarications, etc., may be printed onto the reconstitutable sheet. In some embodiments, indicia may include the identification codes, such as spatial codes, QR codes, bar codes, identification numbers, or other such indicia which can be used to identifying, track, and/or provide information. These indicia and decorative designs may be ink-jet or flexo printed directly onto the reconstitutable sheet. These designs can also be embossed, debossed, or other similar method of imprinting onto the sheet itself.

In some embodiments, design/indicia may also be printed directly onto the support substrate or layer. For example, a decorative layer may be ink-jet printed onto the support substrate and/or layer(s) using an edible ink. Although the example provides for ink-jet printing of the design/indicia, any other printing techniques may be used, such as screening printing, rotary screen printing, flexography, offset gravure, ink jet, bubble jet, dry toner, ribbon transfer, powder coating, spray coating, roll coating, reverse roll coating, slot die coating, hot and/or cold laminating, knife coating, sintering, padding, curtain coating, and the like. In this regard, printing techniques are understood to cover coating techniques.

In some embodiments, the reconstitutable sheet is processed via a casting method. In some embodiments, the casting method can be applied without heat or pressure. For example, any water based edible or non-edible can be first dehydrated using a blend of drying agents or starting with a hydrolyzed base component (i.e., oat). The resultant concentrate can be cast at specific depositions onto flat, non-stick surfaces to create thin films. These films can be allowed to dry in controlled environments.

In some embodiments, the casting method can be applied with heat and/or pressure. For example, the dehydrated "ink" concentrate is subjected to controlled temperatures and/or pressures, allowing for faster drying and potentially different texture outcomes.

In some embodiments, the reconstitutable sheet is processed via a coating method. In some embodiments, the coating method can be applied as a direct coating. For example, the dehydrated food or personal care concentrate is applied directly onto substrates like paper or film. The substrate aids in maintaining the structural integrity of the food film.

In some embodiments, the coating method can be applied as a direct roll coating. For example, the concentrate is passed between two rolls, wherein at least one roll has a patterned surface. This imparts the pattern to the solid milk sheet and can be used for aesthetic or functional purposes.

In some embodiments, the coating method can be applied using a heated or cooled transfer surface. For example, the concentrate is applied to surfaces with controlled temperatures. A cooler surface can expedite drying, while a heated surface can alter texture or other properties of the milk film.

In some embodiments, the reconstitutable sheet is processed via an extrusion method. In some embodiments, the extrusion method can be applied as direct extrusion. For example, dehydrated "food ink or food dough" concentrate is directly extruded through fine plates or rollers, creating structured sheet or essentially 2D forms.

In some embodiments, the extrusion method can be applied as micro extrusion. For example, using micro-scaled plates, extruded layers can be created to create intricate patterns and imagery that can be achieved in addition to layering flavors, different time-released ingredients or hybrids of complimentary products, e.g. printed coffee sheet layered with a oat creamer layer or multi-level smoothie strips with each layer being different components that all become solubilized when water is added.

In some embodiments, the extrusion method can be applied as hot and cold extrusion. For example, the concentrate is extruded under varying temperature conditions. Hot extrusion can lead to caramelization or other flavor changes that can be controlled, while cold extrusion produces a more neutral flavor profile and can eliminate any curing or drying times normally associated with heated print processes.

In some embodiments, the reconstitutable sheet may be arranged in various dispensing configurations. For example, one dispensing configuration may be a continuous tape with or without perforations for tearing. In some embodiments, the continuous tape arrangement of the reconstitutable sheet may be placed in a tape dispenser type device, where a portion of the strip may be torn off with the assistance of a cutting blade. In the continuous tape arrangement, a support substrate, such as release paper may support and or enclose one or more active layers.

In some embodiments, the reconstitutable sheet may be processed on a release paper in the form of dots, small particles, granules, or the like. The reconstitutable sheet may be removed from the release paper. In embodiments where the reconstitutable sheet is formed on a printed support substrate, no release paper may be required. Rather, the reconstitutable sheet may be stored in a dispenser such as a dispenser with openings similar manner to that of a salt-shaker. Other dispensing configurations may include stacking the reconstitutable sheet on top of each other, such as similar to Pez from a Pez dispenser, or packaging the reconstitutable sheet in a pouch or sealed packaging, such as like an individual Band-Aid. Packaging for dispensing may also be printed and/or individualized, for example, with a person's name. In addition, a support substrate may allow for multiple dosages (e.g., portioned layer(s) of active ingredients,) to be attached to one sheet of a support substrate to carry multiple dosages on one sheet instead of individual dosages that are packed loose.

In some embodiments, the reconstitutable sheet and components thereof, such as each layer and support substrate, can be any shape suitable for a desired application. For example, a reconstitutable sheet can be in the form of a rectangular or square strip, sheets, a cube, a sphere, a disk, oval, stars, snowflakes, decorative designs, and the like.

In some embodiments, a reconstitutable sheet can have multiple layers where one or more of the layers are different shapes. For example, a round support substrate may have one or more strip shaped active layers disposed thereon. In another example, the shapes of the reconstitutable sheet may be tailored to meet a particular design need, such as a shape of the item that the dehydrated substance will be included in, or to achieve a desired release profile.

In some embodiments, each layer of the reconstitutable sheet may have a natural, artificial or synthetic colorant added, such as turmeric, beetroot, etc.

In some embodiments, the reconstitutable sheets may be used sublingually, orally, within a food or beverage item, topically, etc., depending upon their configuration. In some embodiments, reconstitutable sheets, which are configured to dissolve/disperse easily, may be used sublingually, whereas a reconstitutable sheet, which is configured to dissolve slowly, may be used within a beverage item. The foregoing examples are, in no way limiting, as slow dissolving/dispersing reconstitutable sheets may be used in a beverage and a fast dissolving/dispersing reconstitutable sheet may be used orally.

In some embodiments, the reconstitutable sheets may be packaged into an unsealed package. The package may then be sealed. In some instances, the package may be flushed with Argon, nitrogen, or other such gas to displace the oxygen within the package, resulting in an oxygen free environment. By doing so, the reconstitutable sheet will not be subjected to oxygen that may cause oxidation. In some embodiments, the reconstitutable sheets may be individually wrapped. In some embodiments, the reconstitutable sheets may be separated by a removable layer (e.g., a paper or plastic removable separator). In some embodiments, the reconstitutable sheets may be stored in a resealable container (e.g., a paper or plastic box or bag comprising a zipper, a button, a tab, a hook, a lid, etc.). In some embodiments, the packaging may be sourced from eco-friendly materials (e.g., biodegradable materials, recycled materials, sustainable materials, etc.)

In some embodiments, packaging methods include, but are not limited to, wrap packaging, vacuum packaging, skin packaging, and gas replacement packaging.

Wrap packaging is a way to package and pack small portions into a tray container in a way that is used in retail outlets. These wrapping packages help prevent the drying of foodstuffs.

Vacuum packaging is a packaging method that removes the air inside after packaging. Such packaging may also incorporate a resealable function. It can be resealed via a flap with an adhesive that is reusable, a zipper, or another method for resealing the package. The resealable function may be reusable multiple times or only once.

Skin packaging has the advantage of keeping the shape of the product in a way that the film is squeezed and packed as it is pressed on the product as the product shape.

The gas used in the typical gas replacement method includes carbon dioxide and nitrogen, which have the effect of inhibiting microbial growth.

Other packaging materials include, but are not limited to flexible pouches, glass jars or containers, clamshell packaging, metal cans, shrink film, paperboard or cardboard boxes, skin boards, skin packs, surlyn film, skin poly film, plastic bottles, strapping material, polyethylene, polyvinyl chloride, tin, aluminum, steel, ceramics, cellulose, cellophane, polypropylene, plastic bags, plastic tubing, and deli containers.

In some embodiments, the reconstitutable sheet comprises a dehydrated substance that comprises an edible liquid. In some embodiments, the edible liquid comprises milk. In some embodiments, the milk comprises mammalian or dairy milk, in some embodiments, the milk comprises cow milk, goat milk, sheep milk, camel milk, yak milk, or buffalo milk. In some embodiments, the milk comprises plant-based milk. In some embodiments, the plant-based milk comprises almond milk, soymilk, oat milk, pistachio milk, macadamia milk, chickpea milk, flax milk, hemp milk, hazelnut milk, sesame milk, coconut milk or cashew milk.

In some embodiments, the edible liquid comprises ingredients that are used to produce, for example, dairy milk or plant-based milk. As non-limiting examples, an edible liquid that comprises almond milk can comprise ingredients such as almonds, an edible liquid that comprises oat milk can comprise ingredients such as oats, an edible liquid that comprises pistachio milk can comprise ingredients such as pistachios, an edible liquid that comprises soymilk can comprise ingredients such as soybeans, an edible liquid that comprises macadamia milk can comprise ingredients such as macadamia nuts, an edible liquid comprising chickpea milk can comprise ingredients such as chickpeas, an edible liquid comprising flax milk can comprise ingredients such as flax seeds, an edible liquid comprising hemp milk can comprise ingredients such as hemp, an edible liquid such as hazelnut milk can comprise ingredients such as hazelnuts, an edible liquid comprising sesame milk can comprise ingredients such as sesame seeds, an edible liquid comprising cashew milk can comprise ingredients such as cashews, an edible liquid comprising coconut milk can comprise ingredients such as coconut, an edible liquid comprising mammalian or dairy milk can comprise, raw, unpasteurized cow, goat, sheep, camel, yak, or buffalo milk.

In some embodiments, the edible liquid comprising milk can be synthetic or natural and/or can be sourced from a laboratory. In some embodiments, the milk sourced from a laboratory comprises milk sourced from precision fermentation, cellular agriculture, plant-based bio-mimicry, synthetic biology algal based production, microbial production, cell cultivation, enzymatic modification, molecular synthesis, algae cultivation, genetic modification, protein formulation, or bioengineered plant proteins.

In some embodiments, the edible liquid further comprises enzymes. Enzymes include, but are not limited to, amylases, lactase, esterase, lipases, proteases, catalase, beta-glucanases, bromelain, cellulases, chymosin, ficin, papain, pectinases, pepsin, transglutaminases, and trypsin.

In some embodiments, the moisture content of the ingredients used to produce the edible liquid are measured for moisture content to ensure proper storage and inhibit contamination growth. Some non-limiting examples of how moisture content can be measured is with a moisture meter or an oven drying method. In some embodiments, the ideal moisture content of the ingredients includes, but is not limited to about 0.0001%, about 0.001%, about 0.01%, about 0.1%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 36%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, and about 50%.

In some embodiments, liquid ingredients, such as mammalian or dairy milk, or dry ingredients, such as almonds, oats, pistachios, cashews, macadamias, soybeans, chickpeas, sesame seeds, flax seeds, hemp, or hazelnuts, are dried to an ideal moisture content. The ideal moisture content includes, but is not limited to about 0.001%, about 0.01%, about 0.1%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 36%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, and about 50%.

In some embodiments, the ingredients used to produce the edible liquid are monitored for contamination such as aflatoxin, mycotoxins, ochratoxin A, etc. Methods for monitoring contamination include, but are not limited to chromatographic methods, spectroscopic methods, and immunochemical methods.

In some embodiments, the ingredients used to produce the edible liquid are soaked prior to soften said ingredients and facilitate easier mixing and/or better nutrient extraction. In some embodiments, the ingredients used to produce the edible liquid are soaked for about 1 second to about 1 minute, about 1 minute to about 5 minutes, about 5 minutes to about 10 minutes, about 10 minutes to about 15 minutes, about 20 minutes to about 25 minutes, about 30 minutes to about 35 minutes, about 40 minutes to about 45 minutes, about 50 minutes to about 55 minutes, about 55 minutes to about 1 hour, about 1 hour to about 2 hours, about 2 hours to about 3 hours, about 3 hours to about 4 hours, about 4 hours to about 5 hours, about 5 hours to about 6 hours, about about 6 hours to 7 hours, about 7 hours to about 8 hours, about 8 hours to about 9 hours, about 9 hours to about 10 hours, about about 10 hours to 11 hours, about 11 hours to about 12 hours, about 12 hours to about 13 hours, about 13 hours to about 14 hours, about 14 hours to about 15 hours, about 15 hours to about 16 hours, about 16 hours to about 17 hours, about 17 hours to about 18 hours, about 18 hours to about 19 hours, about 19 hours to about 20 hours, about 20 hours to about 21 hours, about 21 hours to about 22 hours, about 22 hours to about 23 hours, about 23 hours to about 24 hours, about 24 hours to about 48 hours, about 48 hours to about 76 hours.

In some embodiments, the ingredients used to produce the edible liquid are soaked from about 1 second to about 1 minute, about 1 minute to about 5 minutes, about 5 minutes to about 10 minutes, about 10 minutes to about 15 minutes, about 20 minutes to about 25 minutes, about 30 minutes to about 35 minutes, about 40 minutes to about 45 minutes, about 50 minutes to about 55 minutes, about 55 minutes to about 1 hour, about 1 hour to about 2 hours, about 2 hours to about 3 hours, about 3 hours to about 4 hours, about 4 hours to about 5 hours, about 5 hours to about 6 hours, about 6 hours to 7 hours, about 7 hours to about 8 hours, about 8 hours to about 9 hours, about 9 hours to about 10 hours, about about 10 hours to 11 hours, about 11 hours to about 12 hours, about 12 hours to about 13 hours, about 13 hours to about 14 hours, about 14 hours to about 15 hours, about 15 hours to about 16 hours, about 16 hours to about 17 hours, about 17 hours to about 18 hours, about 18 hours to about 19 hours, about 19 hours to about 20 hours, about 20 hours to about 21 hours, about 21 hours to about 22 hours, about 22 hours to about 23 hours, about 23 hours to about 24 hours, about 24 hours to about 48 hours, about 48 hours to about 76 hours.

In some embodiments, the ingredients used to produce the edible liquid are blanched to produce a smoother edible liquid. In some embodiments, blanching comprises the steps of boiling the ingredients and then immediately cooling the ingredients in cold water.

In some embodiments, the ingredients to produce the edible liquid are ground to an optimal surface area for extraction during the mixing process, maximizing the release of, for example, flavors, nutrients and oils from the ingredients. Grinding methods include, but are not limited to milling, blending, food processing, and manual grinding (e.g. with a mortar and pestle). In some embodiments, the ingredients to produce the edible liquid are ground to a particle size of about 1 micron to 25 microns, about 25 microns to about 50 microns, about 50 microns to about 100 microns, about 100 microns to about 200 microns, about 200 microns to about 300 microns, about 300 microns to about 400 microns, about 400 microns to about 500 microns, about 500 microns to about 600 microns, about 600 microns to about 700 microns, about 700 microns to about 800 microns, about 800 microns to about 900 microns, and about 900 microns to about 1000 microns. In some embodiments, the ingredients to produce the edible liquid are ground to a particle size of about 25 microns, about 30 microns, about 35 microns, about 40 microns, about 45 microns, about 50 microns, about 55 microns, about 60 microns, about 65 microns, about 70 microns, about 75 microns, about 80 microns, about 85 microns, about 90 microns, about 95 microns, about 100, about 125 microns, about 150 microns, about 175 microns, about 200 microns, about 225 microns, about 250 microns, about 275 microns, about 300 microns, about 325 microns, about 350 microns, about 375 microns, about 400 microns, about 425 microns, about 450 microns, about 475 microns, about 500 microns, about 525 microns, about 550 microns, about 575 microns, about 600 microns, about 625 microns, about 650 microns, about 675 microns, about 700 microns, about 725 microns, about 750 microns, about 775 microns, about 800 microns, about 825 microns, about 850 microns, about 875 microns, about 900 microns, about 925 microns, about 950 microns, about 975 microns, and about 1000 microns.

In some embodiment, the ingredients to produce the edible liquid are analyzed and/or evaluated by particle size to ensure the desired particle size is reached. Methods for particle size analysis include, but are not limited to the use of sieves or the use of laser diffraction.

In some embodiments, the ingredients to produce the edible liquid further comprises water. In some embodiments, the water comprises high-quality, purified water. Methods to purify the water include, but are not limited to, deionization, reverse osmosis, boiling, distillation, disinfection, filtration, solar purification, UV radiation, desalination, and iodine addition.

In some embodiments, water is added to the ingredients to produce the edible liquid with an ideal moisture content and an ideal particle size (also referred to as the "dry ingredients"). In some embodiments, the water is added to the dry ingredients in about a 5%/95% (water/dry ingredient) ratio, 10%/90% (water/dry ingredient) ratio, about a 20%/80% (water/dry ingredient) ratio, about a 30%/70% (water/dry ingredient) ratio, about a 40%/60% (water/dry ingredient) ratio, about a 50%/50% (water/dry ingredient) ratio, about a 60%/40% (water/dry ingredient) ratio, about a 70%/30% (water/dry ingredient) ratio, about a 80%/20% (water/dry ingredient) ratio, about a 90%/10% (water/dry ingredient) ratio. In some embodiments, the water/dry ingredient ratio can be a range. Non-limiting examples of ranges of water/dry ingredient ratios include, about 10-30%/90-70%, about 20-40%/80-60%, 30-50%/70-50%, 40-60%/60-40%, 50-70%/50-30%, 60-80%/40-20%, and 70-90%/30-10%.

In some embodiments, the water and the dry ingredients are mixed until well-combined and smooth, ensuring that all of the dry ingredients are well integrated with the water to extract the components, forming a base, and to ensure a smooth, creamy texture for printing or processing into a sheet. Methods of mixing include, but are not limited to manual, hand mixing, blending, whipping, creaming, beating, and the utilization of high-speed mixers, blenders, and processors. Mixing speeds include, but are not limited to about 100 rpm to about 500 rpm, about 500 rpm to about 700 rpm, about 800 rpm to about 900 rpm, about 900 rpm to about 1200 rpm, about 1200 rpm to about 1500 rpm, about 1500 rpm to about 2500 rpm, about 2500 rpm to about 5000 rpm, about 5000 rpm to about 7500 rpm, about 7500 rpm to about 10,000 rpm, about 10,000 rpm to about 15,000 rpm, about 15,000 rpm to about 20,000 rpm, about 20,000 rpm to about 25,000 rpm. The ideal length of time required for proper mixing of water and the dry ingredients include but is not limited to about 30 seconds to about 1 minute, about 1 minute to about 2 minutes, about 2 minutes to about 3 minutes, about 3 minutes to about 5 minutes, about 5 minutes to about 7 minutes, about 7 minutes to about 10 minutes, about 10 minutes to about 15 minutes, about 15 minutes to about 20 minutes, about 20 minutes to about 25 minutes.

In some embodiments, the viscosity of the base is evaluated to ensure it is within the desired range for proper printer or processing into a sheet. A non-limiting example of a method of evaluating viscosity is with a viscometer. Non-limiting examples of the desired viscosity range at a standard temperature of about 20° C. include about 1 cP to about 10 cP, about 10 cP to about 50 cP, about 50 cP to about 100 cP, about 100 cP to about 500 cP, about 500 cP to about 1000 cP, about 1000 cP to about 2000 cP, about 2000 cP to about 3000 cP, about 3000 cP to about 4000 cP, about 4000 cP to about 5000 cP, about 5000 cP to about 6000 cP, about 6000 cP to about 7000 cP, about 8000 cP to about 9000 cP, about 9000 cP to about 10,000 cP, about 10,000 cP to about 15,000 cP, about 15,000 cP to about 20,000 cP, about 20,000 cP to about 25,000 cP, about 25,000 cP to about 30,000 cP, about 30,000 cP to about 35,000 cP, about 35,000 cP to about 40,000 cP, about 40,000 cP to about 45,000 cP, about 45,000 cP to about 50,000 cP, about 50,000 cP to about 55,000 cP, about 55,000 cP to about 60,000 cP, about 60,000 cP to about 65,000 cP, about 65,000 cP to about 70,000 cP, about 70,000 cP to about 75,000 cP, about 75,000 cP to about 80,000 cP, about 80,000 cP to about 85,000 cP, about 85,000 cP to about 90,000 cP, about 90,000 cP to about 95,000 cP, about 95,000 cP to about 100,000 cP.

In some embodiments, the viscosity of the base is measured one or more times during the manufacturing of the reconstitutable sheet.

In some embodiments, the base is filtered to remove any chunky, crunchy, gritty, hard, or otherwise solid particles from the water-dry ingredient mixture. Non-limiting examples of filtration methods include the use of very fine sieves or filtration systems.

In some embodiments, the solid content of the base is measured after filtration to determine concentration of the edible liquid in the base. Non-limiting examples of solid content measurements include the use of oven drying and a refractometer. The solid content of the base can vary depending on the desired flavor profile. Low solid contents (e.g., 0.5-3%) result in a lighter flavor profile, mid-range sold contents (e.g., 3-5%) result in a robust flavor profile, and high solid contents (e.g., greater than 5%) results in a very robust flavor profile. Non-limiting examples of solid content ranges include about 0.01% to about 0.1%, 0.1% to about 0.5%, about 0.5% to about 1%, about 1% to about 2%, about 2% to about 3%, about 3% to about 4%, about 4% to about 5%, about 5% to about 6%, about 6% to about 7%, about 7% to about 8%, about 8% to about 9%, about 9% to about 10%, about 10% to about 11%, about 11% to about 12%, about 12% to about 13%, about 13% to about 14%, about 14% to about 15%.

In some embodiments, the base is homogenized to ensure all the ingredients are evenly distributed and has a consistent texture. Homogenization can occur with or without pressure. A non-limiting example of a homogenizer is an industrial homogenizer, such as a high-pressure homogenizer. The exact pressure and duration depends on the specific instrument and the desired final product characteristics. Non-limiting examples of optimal pressure include, about 100 psi to about 500 psi, about 500 psi to about 2000 psi, about 2000 psi to about 5000 psi, about 5000 psi to about 10,000 psi, about 10,000 psi to about 15,000 psi, and about 15,000 psi to about 20,000 psi. Non-limiting examples of the duration of homogenization include, about 0.1 second to about 1 second, about 1 second to about 5 seconds, about 5 seconds to about 10 seconds, about 10 seconds to about 30 seconds, about 30 seconds to about 1 minute, about 1 minute to about 2 minutes, about 2 minutes to about 3 minutes, about 3 minutes to about 4 minutes, about 4 minutes to about 5 minutes, about 6 minutes to about 7 minutes, about 7 minutes to about 8 minutes, about 8 minutes to about 9 minutes, about 9 minutes to about 10 minutes, about 10 minutes to about 11 minutes, about 11 minutes to about 12 minutes, about 12 minutes to about 13 minutes, about 13 minutes to about 14 minutes, about 14 minutes to about 15 minutes, about 15 minutes to about 16 minutes, about 16 minutes to about 17 minutes, about 17 minutes, to about 18 minutes, about 18 minutes, to about 19 minutes, about 19 minutes to about 20 minutes.

In some embodiments, the base is evaluated for stability to ensure there is no separation of components over time.

Non-limiting examples of methods to evaluate stability include centrifugation or allowing samples to stand over time and observing for separation.

In some embodiments, the dissolvable polymer film may comprise polyvinyl alcohol, polyethylene oxide and/or polyvinyl acetate, while in other embodiments; the dissolvable polymer film may comprise one or more polymers derived from natural materials such as for example, alginates, pullulan, oatmeal, acerola, carboxylated pullulan, guar gum, xanthum gum, acacia gum, gum arabic, tragancanth gum, carboxylated scleroglucan, and banana. In some aspects, the wear layer is adapted to provide a favorable surface for printing of the image layer, such that crisp clear images may be produced and maintained, while ink migration or bleeding is reduced or eliminated.

In some embodiments, the reconstitutable sheet may be used in various applications that may benefit from a supplement. For example, the reconstitutable sheet may be added to a food or beverage, such as a cake mix, a muffin mix, a cupcake mix, a tea bag, a coffee pod, ground coffee, coffee beans which are then ground, powdered chocolate mixes, powdered soup mixes, gelatin mixes, concentrates, such as almond milk concentrate, soybean concentrate, macadamia nut concentrate, and the like. In one example, as the tea in a tea bag and/or coffee in a coffee pod is made using water, a supplement from the dehydrated substance within the tea bag and/or coffee pod, can be released in the tea and/or coffee. In this instance, a supplement may be a sweetener. Other supplements may include a vitamin, mineral, or the like.

In some embodiments, a reconstitutable sheet can include layers, which comprise various concentrations of food, or other such products. In some embodiments, the reconstitutable sheet may comprise concentrates. By incorporating the concentrates into the reconstitutable sheet, shipping costs may be saved, as there may be no need for refrigeration. Additionally, absence of liquid reduces the weight of the shipped product.

In some embodiments, the reconstitutable sheet is reconstituted in liquid to re-hydrate the dehydrate substance(s). For example, upon addition of water to the dehydrated milk reconstitutable sheet, it readily solubilizes, re-hydrating to its liquid state. The solubilization rate and final consistency can be adjusted based on the drying, humidity and printing method used. In some embodiments, the reconstitution can be performed by agitating the reconstitutable sheet in an appropriate volume of liquid. In some embodiments, the agitating comprises manual agitation. Non-limiting examples of reconstitution via manual agitation include, but are not limited to, overnight hydration, vigorous shaking, and a combination of hydration and vigorous shaking. In some embodiments, the agitating comprises mechanical agitation. Non-limiting examples of reconstitution via mechanical agitation include, but are not limited to to use of a blender, mixer, homogenizer, and food processor.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

EXAMPLES

Example 1: Overview of Printed Oat Milk Process

1. Create the enzymatic oat powder base by grinding the oat particle size to a bulk density of at least 450-650 g/L. The enzymatic oat base characteristics are as outlined in FIG. 11.
2. Evaluate the particle size using KSU method MF-2051 with sieve number 12 or less.
3. Slowly fold water (preferably reverse osmosis or purified) and enzymatic oat base together in a 60-80/40-20 ratio of enzymatic oat base to water until combined.
4. Add any additional flavoring or hybrid components.
5. Homogenize at 800 rpm for 15 minutes using a high-speed mixer.
6. Place homogenized oat/water mixture into a screen, coater, thermoformer, or compatible stainless-steel component printer.
7. Print and run the oat base formula to desired deposition.
8. Thermally cure to bring final product to 3-8% water content.
9. Convert sheets to desired serving size using slit or die-cut processes.
10. Package fully converted sheets into a vacuum-packed package.

Example 2: Overview of Printed Almond Milk Process

1. Create the enzymatic almond powder base by grinding the almond particle size to a bulk density of at least 450-650 g/L. The enzymatic almond base characteristics are as outlined in FIG. 12.
2. Evaluate the particle size using KSU method MF-2051 with sieve number 12 or less.
3. Slowly fold water (preferably reverse osmosis or purified) and enzymatic almond base together in equal amounts until combined.
4. Add any additional flavoring or hybrid components.
5. Homogenize at 800 rpm for 15 minutes using a high-speed mixer.
6. Place homogenized almond/water mixture into a screen, coater, thermoformer, or compatible stainless-steel component printer.
7. Print and run the almond base formula to desired deposition.
8. Thermally cure to bring final product to 3-8% water content.
9. Convert sheets to desired serving size using slit or die-cut processes.
10. Package fully converted sheets into a vacuum-packed package.

Example 3: Overview of Printed Dairy Milk Process

1. Create the dairy milk powder base by drying milk powder to a particle size between 2-20 micrometers, with a fat content of 0-10% and a residual water content of 4% or less. The dairy milk base characteristics are as outlined in FIG. 13.
2. Slowly fold water (preferably reverse osmosis or purified) and dairy milk powder base together in equal amounts until combined.
3. Add any additional flavoring or hybrid components.
4. Homogenize at 800 rpm for 15 minutes using a high-speed mixer.

5. Place homogenized dairy milk/water mixture into a screen, coater, thermoformer, or compatible stainless-steel component printer.

6. Print and run the almond base formula to desired deposition.

7. Thermally cure to bring final product to 3-8% water content.

8. Convert sheets to desired serving size using slit or die-cut processes.

9. Package fully converted sheets into a vacuum-packed package.

Example 4: Process to Produce a Reconstitutable Almond Sheet and Reconstitution to Almond Milk Almond Milk Ingredients and Delivery. Almonds were transported to the facility, ensuring they were of high quality, free from contaminants, and suitable for the production process. The moisture content of the almonds was measured with a moisture meter or oven drying to prevent mold. Measurement of the moisture content of the almonds was important to prevent mold growth and ensured proper storage. The almonds were also tested for toxic compounds, such as a toxic compound produced by a mold, such as aflatoxin.

Almond Preparation. The almonds were soaked in water for about 8 to 12 hours to soften them and facilitate easier mixing and better nutrient extraction. Optionally, for a smoother almond milk, almonds can be blanched to remove their skins. Blanching involves briefly boiling the almonds and then immediately cooling the almonds in cold water, resulting in the easy removal of the almond skin. The almonds were finely ground to produce a consistent almond paste. The almonds were typically ground to a fine paste-like consistency, with particle sizes from about 50 microns to about 250 microns to ensure an optimal surface area for extraction during the mixing process and to maximize the release of flavors, nutrients, and oils from the almonds.

After grinding, the almond paste's consistency was evaluated to ensure it has the desired particle size, typically between about 50 microns to about 250 microns, which was performed with sieves or laser diffraction methods.

Water Integration. High-quality, purified water, typically deionized or subjected to reverse osmosis, was used. Ground almonds were mixed with water in a ratio of about 50% to about 70% (w/v) water to about 30% to about 50% (w/v) oats, forming an almond-water slurry to ensure optimal nutrient and flavor extraction.

Mixing. The almond-water mixture was mixed until smooth, ensuring all the almond components are well-integrated with the water. The main aim of mixing was to mix the almond flour or paste with water to extract its components and produce a creamy texture suitable for printing or processing into sheet form.

High-speed mixers were used to ensure thorough mixing and optimal extraction. The mixing was vigorous and performed for several minutes to maximize the yield of almond milk from the almond flour/paste. Mixing is performed at high speeds, about 10,000 RPM to about 15,000 RPM, to ensure thorough mixing. The duration varied but may be between about two to about six minutes.

Viscosity Measurement. The viscosity of the almond-water mixture was checked with a viscometer. Advantageously, about 50 to about 45,000 mPa·s (or cP) at 20° C. is a desired viscosity.

Filtration. The mixture was filtered to remove solid almond particles, resulting in a smoother almond milk base. After mixing, the mixture was passed through industrial sieves or filtration systems to remove solid almond particles and achieve a smooth milk texture. The screens used in these systems can be very fine, often ranging between about 50 microns to about 250 microns.

The solid content or total solids of the almond milk was measured post-filtration to provide a concentration of the milk and was done with methods such as oven drying or a refractometer. A typical batch may have about 0.5-15% solid content. 0.5-3% would have a lighter taste, with 3-5% having a robust taste. Greater than 5% would have an even more robust flavor.

Ingredient Addition. To the filtered almond milk, Calcium carbonate (for fortification), typically in the range of 300 to 400 mg/cup (240 mL) of almond milk, sunflower lecithin (as an emulsifier), typically in a concentration of about 0.1% to 0.5% w/v, and/or sea salt may be added in small amounts, such as about 0.01% to about 0.5% w/v. Stabilizers and thickeners, such as guar gum or gellan gum were incorporated to help stabilize the milk and improve its texture. The concentration of the stabilizers and thickeners were about 0.05% to about 2% w/v, depending on the desired viscosity and mouthfeel. Natural flavors were optionally added for enhanced taste and/or flavor fortification.

Homogenization. The mixture was then homogenized, ensuring that all ingredients were evenly distributed and the liquid almond compound has a consistent texture. Industrial homogenizers, such as high-pressure homogenizers, were employed. These machines pushed the almond milk under high pressure through a narrow gap ensuring an even distribution of particles, leading to a smooth and stable milk. Typically, almond milk was subjected to a pressure of about 2000 psi to about 5000 psi during homogenization. The exact pressure and duration depended on the specific equipment used and the desired final product characteristics.

The milk was checked for its stability to no separation of components over time, which was performed by centrifugation or by allowing samples to stand and observing for separation.

Viscosity Confirmation. The almond base exhibited a viscosity that lies between 2,500 cP-40,000 cP, with an optimal range being between 4,000 cP-25,000 cP, which ensured a suitable consistency for the printing process.

Screen/Coater/Extrusion Printing Preparation. Extruder/Slicer. The printer had a bed equipped with a vacuum, onto which a release sheet (made of plastic, paper, or lined with a non-stick coating like silicone) or a stainless steel belt was placed. The vacuum secured the release sheet, which prevented it from moving. Positioned above this release sheet was a stencil with an open design and a solid surrounding area which accommodated the almond or alternate milk base.

Applying Almond Base on Screen Printer/Coater/Extruder.—The almond base was poured onto either the left side, right side, or both sides of the stencil, coater or extruder.

Squeegee Process. A squeegee, fitted with a silicone head, was employed by the screen printer. Applying consistent pressure, the squeegee smoothly transferred the almond base from the solid area of the stencil across the open design, first moving left, then right. if necessary, it retraced its path for an even application. Post-application, the stencil rose away from the bed. If done via Coater process the almond or alternate milk liquid compound was squeezed through a form creating the proper thickness and then printed as a continuous roll and converted to a desired size after drying.

Sheet Removal. The release sheet was removed, which carried the freshly printed almond base.

Drying Process. The printed sheet was dried, with multiple methods available based on the printed formulation such as, natural drying indoors or outdoors, leveraged ambient airflow and temperature. The sheet may be baked in an oven at a temperature of about 75 degrees C. to about 90 degrees C. The heating time was about five minutes to about sixty minutes. Convection ovens circulate air for uniform drying. Other techniques, such as infrared drying, may also be used.

Moisture Analysis. Post-drying, the sheet's moisture content was evaluated to fall between about 3-7%, with an ideal moisture content around 5%.

Using am OHAUS MB27 moisture analyzer, a 1-gram sample from the batch was tested. If moisture levels were outside the desired range, the drying process was continued and retested until an optimal moisture content was achieved.

Manual Reconstitution. The dried sheet was submerged in a container filled with water. The water quantity varies—see previous Example. The vessel was be sealed and shaken manually for approximately one to two minutes until the sheet and water are fully dissolved forming fresh almond milk.

Overnight Hydration. As an alternative, the dried sheet was submerged in water overnight. The rehydrated sheet was then mixed with minimal hand shaken agitation of approximately fifteen to thirty seconds to produce almond milk.

Mechanical Reconstitution. For a faster process, the dried sheet and water were combined and placed in a blender or mixture and blended at a high speed setting for approximately fifteen to thirty seconds producing fresh almond milk.

End Result. After thorough mixing, the liquid was transformed into almond milk, ready for immediate consumption or refrigerated for future consumption.

Example 5: Reconstitutable Oat Milk Sheet Ingredients

Oat "Ink": The preparation of oat "ink" was as described in FIG. 14 and the preparation of 1 L of printed oat "ink" was as described in FIG. 15.

Enzymatically Treated Oat Milk: The oat milk may be treated by an enzyme to hydrolyze the starch in the oat milk, such as an amylase, preferably alpha amylase.

Glycerin: The glycerin was a food-grade glycerin, advantageously a vegetable glycerin.

Printing an Oat Sheet: To print an oat sheet, the mixture was loaded into a printer, or coater, or caster, or extruder, and printed to a thickness of about 1 mm to about 3 mm and heated for the sheet to cure.

Drying an Oat Sheet: Drying was based upon print thickness and oil content. Advantageously, the heat was about 75° C. to about 90° C. using infrared, microwave, or oven heat. The heating time was about five minutes to about sixty minutes.

Reconstitution: The reconstitution of the oat sheet was as described in FIG. 16. To reconstitute 1 L of oat milk was as described in FIG. 17. To reconstitute about 8 ounces of oat milk was as described in FIG. 18. The oat sheet was mixed or blended until fully dissolved and reconstituted into oat milk.

Example 6: Process to Produce a Reconstitutable Oat Milk Sheet and Reconstitution to Oat Milk Oat Milk Ingredients and Delivery. Oats were transported to the facility, ensuring they were of high quality, free from contaminants, and suitable for the production process. The moisture content of the oats was measured with a moisture meter or oven drying to prevent mold. Measurement of the moisture content of the oats was important to prevent mold growth and ensured proper storage. The oats were also tested for toxic compounds, such as a toxic compound produced by a mold, such as aflatoxin.

Oat Preparation. The oats were finely ground to produce a consistent oat paste. The oats were typically ground to a fine paste-like consistency, with particle sizes from about 50 microns to about 250 microns to ensure an optimal surface area for extraction during the mixing process and to maximize the release of flavors, nutrients, and oils from the oats.

After grinding, the oat paste's consistency was evaluated to ensure it has the desired particle size, typically between about 50 microns to about 250 microns, which was performed with sieves or laser diffraction methods.

Water Integration. High-quality, purified water, typically deionized or subjected to reverse osmosis, was used. Ground oats were mixed with water in a ratio of about 50% to about 70% (w/v) water to about 30% to about 50% (w/v) oats, forming an oat-water slurry to ensure optimal nutrient and flavor extraction.

Mixing. The oat-water mixture was mixed until smooth, ensuring all the oat components are well-integrated with the water. The main aim of mixing was to mix the oat flour or paste with water to extract its components and produce a creamy texture suitable for printing or processing into sheet form.

High-speed mixers were used to ensure thorough mixing and optimal extraction. The mixing was vigorous and performed for several minutes to maximize the yield of oat milk from the oat flour. Mixing is performed at high speeds, about 10,000 RPM to about 15,000 RPM, to ensure thorough mixing. The duration varied but may be between about two to about six minutes.

Viscosity Measurement. The viscosity of the oat-water mixture was checked with a viscometer. Advantageously, about 50 to about 45,000 mPa·s (or cP) at 20° C. is a desired viscosity.

Filtration. The mixture was filtered to remove solid oat particles, resulting in a smoother oat milk base. After mixing, the mixture was passed through industrial sieves or filtration systems to remove solid oat particles and achieve a smooth milk texture. The screens used in these systems can be very fine, often ranging between about 50 microns to about 250 microns.

The solid content or total solids of the oat milk was measured post-filtration to provide a concentration of the milk and was done with methods such as oven drying or a refractometer. A typical batch may have about 0.5-15% solid content. 0.5-3% would have a lighter taste, with 3-5% having a robust taste. Greater than 5% would have an even more robust flavor.

Ingredient Addition. To the filtered oat milk, sea salt may be added in small amounts, such as about 0.01% to about 0.5% w/v. Stabilizers and thickeners, such as guar gum or gellan gum were incorporated to help stabilize the milk and improve its texture. The concentration of the stabilizers and thickeners were about 0.05% to about 2% w/v, depending on the desired viscosity and mouthfeel. Natural flavors were optionally added for enhanced taste and/or flavor fortification.

Homogenization. The mixture was then homogenized, ensuring that all ingredients were evenly distributed and the liquid oat compound has a consistent texture. Industrial homogenizers, such as high-pressure homogenizers, were employed. These machines pushed the oat milk under high pressure through a narrow gap ensuring an even distribution of particles, leading to a smooth and stable milk. Typically, oat milk was subjected to a pressure of about 2000 psi to about 5000 psi during homogenization. The exact pressure and duration depended on the specific equipment used and the desired final product characteristics.

The milk was checked for its stability to no separation of components over time, which was performed by centrifugation or by allowing samples to stand and observing for separation.

Viscosity confirmation. The oat base exhibited a viscosity that lies between 2,500 cP-40,000 cP, with an optimal range being between 4,000 cP-25,000 cP, which ensured a suitable consistency for the printing process.

Screen/Coater/Extrusion Printing Preparation. Extruder/Slicer. The printer had a bed equipped with a vacuum, onto which a release sheet (made of plastic, paper, or lined with a non-stick coating like silicone) or a stainless steel belt was placed. The vacuum secured the release sheet, which prevented it from moving. Positioned above this release sheet was a stencil with an open design and a solid surrounding area which accommodated the oat base.

Applying Oat Base on Screen Printer/Coater/Extruder.— The oat base was poured onto either the left side, right side, or both sides of the stencil, coater or extruder.

Squeegee Process. A squeegee, fitted with a silicone head, was employed by the screen printer. Applying consistent pressure, the squeegee smoothly transferred the oat base from the solid area of the stencil across the open design, first moving left, then right. if necessary, it retraced its path for an even application. Post-application, the stencil rose away from the bed. If done via Coater process the oat liquid compound was squeezed through a form creating the proper thickness and then printed as a continuous roll and converted to a desired size after drying.

Sheet Removal. The release sheet was removed, which carried the freshly printed oat base.

Drying Process. The printed sheet was dried, with multiple methods available based on the printed formulation, such as natural drying indoors or outdoors, leveraged ambient airflow and temperature. The sheet may be baked in an oven at a temperature of about 75 degrees C. to about 90 degrees C. The heating time was about five minutes to about sixty minutes. Convection ovens circulate air for uniform drying. Other techniques, such as infrared drying, may also be used.

Moisture Analysis. Post-drying, the sheet's moisture content was evaluated to fall between about 3-7%, with an ideal moisture content around 5%.

Using an OHAUS MB27 moisture analyzer, a 1-gram sample from the batch was tested. If moisture levels were outside the desired range, the drying process was continued and retested until an optimal moisture content was achieved.

Manual Reconstitution. The dried sheet was submerged in a container filled with water. The water quantity varies-see previous Example. The vessel was be sealed and shaken manually for approximately one to two minutes until the sheet and water are fully dissolved forming fresh oat milk.

Overnight Hydration. As an alternative, the dried sheet was submerged in water overnight. The rehydrated sheet was then mixed with minimal hand shaken agitation of approximately fifteen to thirty seconds to produce oat milk.

Mechanical Reconstitution. For a faster process, the dried sheet and water were combined and placed in a blender or mixture and blended at a high speed setting for approximately fifteen to thirty seconds producing fresh oat milk.

End Result. After thorough mixing, the liquid was transformed into oat milk, ready for immediate consumption or refrigerated for future consumption.

The invention is further described by the following numbered paragraphs:

1. A reconstitutable sheet comprising a dehydrated substance that can be reconstituted to a hydrated form, wherein the dehydrated substance comprises an edible liquid.

2. The reconstitutable sheet of paragraph 1, wherein the edible liquid comprises a base comprising dry ingredients and a fluid medium.

3. The reconstitutable sheet of paragraph 2, wherein the fluid medium is water.

4. The reconstitutable sheet of paragraph 2, wherein the edible liquid comprises milk.

5. The reconstitutable sheet of paragraph 4, wherein the milk comprises mammalian or dairy milk.

6. The reconstitutable sheet of paragraph 5, wherein the mammalian or dairy milk comprises cow milk, goat milk, sheep milk, camel milk, yak milk, or buffalo milk.

7. The reconstitutable sheet of paragraph 2, wherein the milk comprises plant-based milk.

8. The reconstitutable sheet of paragraph 7, wherein the plant-based milk comprises almond milk, soy milk, oat milk, pistachio milk, macadamia milk, chickpea milk, flax milk, hemp milk, hazelnut milk, sesame milk, coconut milk or cashew milk.

11. The reconstitutable sheet of paragraph 1, wherein the dehydrated substance comprises 3-15% by weight of the moisture of the substance in hydrated form.

12. The reconstitutable sheet of paragraph 11, wherein the dehydrated substance comprises 3-6% by weight of the moisture of the substance in hydrated form.

13. The reconstitutable sheet of paragraph 1, wherein the reconstitutable sheet comprises the dimensions: about 0.5 mm to about 1 mm, about 1 mm to 1 cm, about 1 cm to about 100 cm in length, about 1 cm to about 100 cm in height, and about 0.05 mm to about 50 mm in thickness.

14. The reconstitutable sheet of paragraph 1, wherein the reconstitutable sheet comprises two or more layers.

15. The reconstitutable sheet of paragraph 14, wherein the two or more layers comprise the same dehydrated substance.

16. The reconstitutable sheet of paragraph 14, wherein the two or more layers comprise different dehydrated substances.

17. The reconstitutable sheet of paragraph 1, wherein the sheet is processed via a printing method.

18. The reconstitutable sheet of paragraph 1, wherein the sheet is processed via a casting method.

19. The reconstitutable sheet of paragraph 1, wherein the sheet is processed via a coating method.

20. The reconstitutable sheet of paragraph 1, wherein the sheet is processed via an extrusion method.

21. The reconstitutable sheet of paragraph 1, further comprising a support substrate.

22. The reconstitutable sheet of paragraph 21, wherein the support substrate is dissolvable in a liquid.

23. The reconstitutable sheet of paragraph 21, wherein the dehydrated substance is processed on the support substrate.

24. The reconstitutable sheet of paragraph 23, wherein the dehydrated substance and the support substrate are uniform in size.

25. A package comprising a reconstitutable sheet wherein the reconstitutable sheet comprises a dehydrated substance that can be reconstituted to a hydrated form, and wherein the dehydrated substance comprises an edible liquid.

26. A method of producing a reconstitutable sheet wherein the reconstitutable sheet comprises a dehydrated substance that can be reconstituted to a hydrated form, and wherein the dehydrated substance comprises an edible liquid, the method comprising:
- (a) preparing the dry ingredients,
- (b) incorporating the dry ingredients with the fluid medium to form a base,
- (c) homogenizing the base,
- (d) generating the edible liquid by processing the base with a printer, coater, caster or an extruder,
- (e) drying the edible liquid to form the reconstitutable sheet comprising the dehydrated substance, and
- (f) reconstituting the reconstitutable sheet in a fluid medium.

27. The method of paragraph 26, wherein step (a) further comprises the step:
- (i) milling, grinding, or blending the dry ingredients into a fine paste or powder-like consistency.

28. The method of paragraph 26, wherein step (d) further comprises the steps:
- (i) placing a release sheet onto the printer, coater, caster or extruder, wherein the printer further comprises a stencil,
- (ii) pouring the base onto the stencil, coater, caster or extruder,
- (iii) removing the release sheet, which carries the freshly processed edible liquid.

29. The method of paragraph 26, wherein step (e) comprises natural indoor or outdoor drying, drying with leveraged airflow and temperature, drying via solar radiation, drum drying, convection drying, oven baking, microwave drying, or infrared drying.

30. The method of paragraph 26, wherein step (f) comprises manual reconstitution, overnight hydration, or mechanical reconstitution.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A kit for an edible hydrated liquid milk, said kit comprising:
   a water-reconstitutable printed, cast, coated, or extruded milk concentrate sheet; and instructions:
   wherein the sheet comprises:
   (a) a dehydrated milk,
      wherein
      the dehydrated milk consists of dehydrated cow milk or dehydrated plant-based milk;
   (b) a water-soluble polymer binding agent comprising agar-agar or carrageenan; and
   (c) plant-based protein;
      wherein:
      (i) the sheet has a length (L) and height (H) each of about 0.05 cm to about 100 cm and a thickness (T) of about 0.005 cm ((to about 5 cm whereby L:H:T is 1:1:0.01 to 1:1:0.05 and thereby the water-reconstitutable sheet has a two-dimensional form,
      (ii) the sheet is prepared by admixing the dehydrated milk, the water soluble polymer binding agent, and the plant-based protein to form an admixture; and printing, casting, coating or extruding the admixture into the two-dimensional form,
      (iii) the sheet has a 3-8% water content, and
      (iv) the sheet is in a predetermined portion size; and
   wherein the instructions are for reconstitution of the sheet into the edible hydrated liquid milk and specify an appropriate volume of liquid comprising water for dissolution of the sheet into the edible hydrated liquid milk; and
   wherein dissolving the sheet in the appropriate volume of liquid comprising water obtains the edible hydrated liquid milk.

2. The kit of claim 1, wherein the reconstitution dissolving the sheet in the appropriate volume of liquid agitating the sheet in the appropriate volume of liquid to dissolve and distribute the sheet, wherein the agitating comprises mechanical agitation or manual agitation.

3. The kit of claim 1, wherein the sheet further comprises fortifying nutritional enhancers, wherein the fortifying nutritional enhancers comprise vitamins, minerals, fats, carbohydrates, colorings, or flavorings.

4. The kit of claim 1, wherein the milk consists of oat milk or almond milk.

5. The kit of claim 1, comprising two or more of the sheets.

6. The kit of claim 5, wherein each of the two or more sheets are from the same milk.

7. The kit of claim 5, comprising a first set of two or more sheets and a second set of two or more sheets, wherein in the first set each of the two or more sheets are from a first milk, and in the second set each of the two or more sheets are from a second milk, and the first milk is different than the second milk.

8. The kit of claim 1, wherein the sheet is prepared by printing.

9. The kit of claim 1, wherein the sheet is prepared by casting.

10. The kit of claim 1, wherein the sheet is prepared by coating.

11. The kit of claim 1, wherein the sheet is prepared by extrusion.

12. The kit of claim 1, further comprising a support substrate upon which the sheet is positioned.

13. The kit of claim 12, wherein the support substrate is dissolvable in the liquid comprising water.

14. The kit of claim 12, wherein the sheet is printed, cast, coated, or extruded on the support substrate.

15. A package comprising a water-reconstitutable printed, cast, coated, or extruded milk concentrate sheet; and instructions:
   wherein the sheet comprises:
   (a) a dehydrated milk,
      wherein
      the dehydrated milk consists of dehydrated cow milk or dehydrated plant-based milk:
   (b) a water-soluble polymer binding agent comprising agar-agar or carrageenan; and
   (c) plant-based protein;
      wherein:
      (i) the sheet has a length (L) and height (H) each of about 0.05 cm to about 100 cm and a thickness (T) of about 0.005 cm to about 5 cm whereby L:H:T is 1:1:0.01 to 1:1:0.05 and thereby the water-reconstitutable sheet has a two-dimensional form,
      (ii) (ii) the sheet is prepared by admixing the dehydrated milk, the water soluble polymer binding agent, and the plant-based protein to form an admixture; and printing, casting, coating, or extruding the admixture into the two-dimensional form, (iii) (iii) the sheet has a 3-8% water content, and
(iv) (iv) the sheet is in a predetermined portion size; and wherein the instructions are for reconstitution of the sheet into the edible hydrated liquid milk and specify an appropriate volume of liquid comprising water for dissolution of the sheet into the edible hydrated liquid milk; and wherein dissolving the sheet in the appropriate volume of liquid comprising water obtains the edible hydrated liquid milk.

16. The package of claim 15, comprising more than one sheet, wherein each sheet is individually wrapped, stacked and separated by a removable layer, or stored in a resealable container.

17. The package of claim 15 wherein the sheet is prepared by printing.

18. The package of claim 15 wherein the sheet is prepared by casting.

19. The package of claim 15 wherein the sheet is prepared by coating.

20. The package of claim 15 wherein the sheet is prepared by extrusion.

21. The package of claim 15 wherein the milk consists of oat milk or almond milk.

22. The package of claim 21, wherein the milk consists of oat milk.

23. The kit of claim 4, wherein the milk consists of oat milk.

24. The kit of claim 4, wherein the milk consists of almond milk.

25. The package of claim 21, wherein the milk consists of almond milk.

26. The kit of claim 1, wherein the milk consists of cow milk.

27. The package of claim 15, wherein the milk consists of cow milk.

28. A water-reconstitutable printed, cast, coated, or extruded milk concentrate sheet for an edible hydrated liquid milk comprising:
(a) a dehydrated milk,
   wherein:
      the dehydrated milk consists of dehydrated cow milk or dehydrated plant-based milk;
(b) a water-soluble polymer binding agent comprising agar-agar or carrageenan; and
(c) plant-based protein;
   wherein:
      (i) the sheet has a length (L) and height (H) each of about 0.05 cm to about 100 cm and a thickness (T) of about 0.005 cm to about 5 cm whereby L:H:T is 1:1:0.01 to 1:1:0.05 and thereby the water-reconstitutable sheet has a two-dimensional form,
      (ii) the sheet is prepared by admixing the dehydrated milk, the water soluble polymer binding agent, and the plant-based protein to form an admixture; and printing, casting, coating, or extruding the admixture into the two-dimensional form,
      (iii) the sheet has a 3-8% water content, (iv) the sheet is in a predetermined portion size; and (v) dissolving the sheet in an appropriate volume of liquid comprising water obtains the edible hydrated liquid milk. milk.

29. The sheet of claim 28, wherein the milk consists of almond milk.

30. The sheet of claim 28, wherein the milk consists of oat milk.

* * * * *